United States Patent
McCann et al.

(10) Patent No.: US 6,662,017 B2
(45) Date of Patent: Dec. 9, 2003

(54) METHODS AND SYSTEMS FOR ROUTING MESSAGES ASSOCIATED WITH PORTED SUBSCRIBERS IN A MOBILE COMMUNICATIONS NETWORK

(75) Inventors: Thomas Matthew McCann, Morrisville, NC (US); Raghavendra Gopala Rao, Cary, NC (US); Robert Fulton West, Jr., Raleigh, NC (US); Peter Joseph Marsico, Carrboro, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/759,743

(22) Filed: Jan. 12, 2001

(65) Prior Publication Data

US 2001/0029182 A1 Oct. 11, 2001

Related U.S. Application Data

(63) Continuation-in-part of application No. 09/471,946, filed on Dec. 23, 1999
(60) Provisional application No. 60/177,523, filed on Jan. 21, 2000.

(51) Int. Cl.[7] ................................................ H04R 7/22
(52) U.S. Cl. ........................ 455/461; 455/445; 455/433
(58) Field of Search ................................. 455/445, 432, 455/433, 412, 414, 417, 461

(56) References Cited

U.S. PATENT DOCUMENTS

| | | |
|---|---|---|
| 4,310,727 A | 1/1982 | Lawser |
| 4,754,479 A | 6/1988 | Bicknell et al. |
| 5,237,604 A | 8/1993 | Ryan |
| 5,247,571 A | 9/1993 | Kay et al. |

(List continued on next page.)

FOREIGN PATENT DOCUMENTS

| | | |
|---|---|---|
| EP | 0 512 962 A2 | 11/1992 |
| EP | 0 944 276 A1 | 9/1999 |
| WO | WO 95/12292 | 5/1995 |
| WO | WO96/11557 | 4/1996 |
| WO | WO97/33441 | 9/1997 |
| WO | WO 99/11087 | 3/1999 |
| WO | WO00/16583 | 3/2000 |

OTHER PUBLICATIONS

Rockhold, "Or," Wireless Review, p. 22, 23, 26, 28, 30, 32, (Aug. 15, 2000).
ETSI, "Digital Cellular Telecommunications Systems (Phase 2++); Support of Mobile Number Portability (MNP); Technical Realisation; Stage 2," Global System for Mobile Communications, p. 1–71, (1998).

*Primary Examiner*—William Trost
*Assistant Examiner*—Philip J. Sobutka
(74) *Attorney, Agent, or Firm*—Jenkins, Wilson & Taylor, P.A.

(57) ABSTRACT

A porting control routing (PCR) node (302) is adapted to efficiently route signaling messages associated with a mobile subscriber that has been either ported in to or out of a service provider's wireless communication network. The PCR node (302) includes both range- and exception based routing rule databases (348 and 346). These databases increase flexibility in allocating mobile identification numbers among multiple mobile service nodes. Furthermore, the association of a ported status indicator and related routing information with entries in the exception based database allows the PCR node (302) to more efficiently manage a service provider's mobile service resources.

33 Claims, 17 Drawing Sheets

U.S. PATENT DOCUMENTS

| | | | |
|---|---|---|---|
| 5,251,248 | A | 10/1993 | Tokunaga et al. |
| 5,400,390 | A | 3/1995 | Salin |
| 5,422,941 | A | 6/1995 | Hasenauer et al. |
| 5,423,068 | A | 6/1995 | Hecker |
| 5,442,683 | A | 8/1995 | Hoogeveen |
| 5,455,855 | A | 10/1995 | Hokari |
| 5,457,736 | A | 10/1995 | Cain et al. |
| 5,481,603 | A | 1/1996 | Gutierrez et al. |
| 5,504,804 | A | 4/1996 | Widmark et al. |
| 5,526,400 | A | 6/1996 | Nguyen |
| 5,579,372 | A | 11/1996 | Astrom |
| 5,590,398 | A | 12/1996 | Matthews |
| 5,594,942 | A | 1/1997 | Antic et al. |
| 5,623,532 | A | 4/1997 | Houde et al. |
| 5,689,548 | A | 11/1997 | Maupin et al. |
| 5,706,286 | A | 1/1998 | Reiman et al. |
| 5,711,002 | A | 1/1998 | Foti |
| 5,832,382 | A | 11/1998 | Alperovich |
| 5,854,982 | A | 12/1998 | Chambers et al. |
| 5,878,347 | A | 3/1999 | Joensuu et al. |
| 5,890,063 | A | 3/1999 | Mills |
| 5,953,662 | A | 9/1999 | Lindquist et al. |
| 5,953,663 | A * | 9/1999 | Maupin et al. ............. 455/433 |
| 6,006,098 | A | 12/1999 | Rathnasabapathy et al. |
| 6,049,714 | A * | 4/2000 | Patel .......................... 455/433 |
| 6,097,960 | A | 8/2000 | Rathnasabapathy et al. |
| 6,115,463 | A | 9/2000 | Coulombe et al. |
| H1895 | H | 10/2000 | Hoffpauir et al. |
| 6,128,377 | A | 10/2000 | Sonnenberg |
| 6,138,016 | A | 10/2000 | Kulkarni et al. |
| 6,138,023 | A | 10/2000 | Agarwal et al. |
| 6,144,857 | A | 11/2000 | Price et al. |
| 6,148,204 | A | 11/2000 | Urs et al. |
| 6,192,242 | B1 * | 2/2001 | Rollender ................... 455/433 |
| 6,226,517 | B1 * | 5/2001 | Britt et al. ................... 455/445 |
| 6,424,832 | B1 | 7/2002 | Britt et al. |
| 6,535,746 | B1 | 3/2003 | Yu et al. |

OTHER PUBLICATIONS

Smith, "Number Portability Pileup," Telephony, p. 22, 24, 26, (Jan. 6, 1997).

Jain et al., "Phone Number Portability for PCS Systems with ATM Backbones Using Distributed Dynamic Hashing," IEEE, vol. 15 (No. 1), p. 96–105, (Jan., 1997).

Heinmiller, "Generic Requirements for SCP Application and GTT Function for Number Portability," Illinois Number Portability Workshop, p. 1–50, (Sep. 4, 1996).

International Telecommuniation Union, "Series Q: Switching and Signalling; Specifications of Signalling System No. 7—Signalling Connection Control Part," p. 11–16, (Jul., 1996).

Rice, "SS7 Networks in a PCS World," Telephony, pp. 138, 140, 142, 144, 146, (Jun. 24, 1996).

Anonymous, "Generic Switching and Signaling Requirements for Number Portability," AT&T Network Systems, No. 1, p. 1–75, (Feb. 2, 1996).

Jain et al., "A Hashing Scheme for Phone Number Portability in PCS Systems with ATM Backbones," Bell Communications Research, p. 593–597, (1996).

ETSI, "Digital Cellular Telecommunications System (Phase 2+); Mobile Application Part (MAP) Specification," Global System for Mobile Communications, p. 112–114, (1996).

TEKELEC, "EAGLE© STP Planning Guide," No. 3.0, p. 1–B2, ( May, 1996).

Bishop, "Freeing the Network for Competition," Telecommunicatins, p. 75–80, (Apr., 1995).

Giordano et al., "PCS Number Portability," IEEE, p. 1146–1150, (Sep., 1994).

Bellcore, "Signaling Transfer Point (STP) Generic Requirements," Bell Communications Research, No. 1, p. ii–xxii, 4-84—J14, (Jun., 1994).

Telcordia Technologies, "CCS Network Itnerface Specification (CCSNIS) Supporting SCCP and TCAP," Bell Communications Research, p. ii–xii, 1-1—3-6, A-1—C-22, (Mar., 1994).

Buckles, "Very High Capacity Signaling Transfer Point for Intelligent Network Services," DSC Communications Corporation, p. 1308–1311, (1988).

* cited by examiner

G-PORT DATA TABLE

| KEY(S) | | DATA FIELDS | | | | | |
|---|---|---|---|---|---|---|---|
| 372 | 374 | 376 | 378 | 380 | 382 | 384 | 386 | 388 | 389 |
| MSISDN | ENTITY | PC | SSN | RI | ENTITY ADDRESS | RN | NP STATUS | IMSI | D-ACTION |
| 9193803833 | HLR | 4-0-0 | 6 | RT-ON-SSN | 3032211234(HLRA) | -- | NOT PORTED | 9192220000 | NONE |
| 2123675637 | HLR | 4-0-1 | 6 | RT-ON-SSN | 2023211234(HLRB) | -- | NOT PORTED | 9192220001 | NONE |
| 7704545731 | HLR | 4-0-0 | 6 | RT-ON-SSN | 3033211234(HLRA) | -- | NOT PORTED | 9192220002 | NONE |
| 9193803414 | HLR | 5-0-0 | -- | RT-ON-GT | -- | 9194326567 | PORTED OUT | 9192220003 | REPLACE |
| 9193803414 | EIR | -- | -- | RT-ON-GT | -- | 9194326433 | PORTED OUT | 9192220003 | APPEND |
| 9199672400 | HLR | -- | -- | -- | -- | -- | NKTBP | 9193452200 | NONE |

GTT DATA TABLE

| KEY RANGE | | DATA FIELDS | | | |
|---|---|---|---|---|---|
| 392 | 394 | 396 | 398 | 400 | 402 |
| MINIMUM MSISDN | MAXIMUM MSISDN | PC | SSN | RI | TT |
| 9193800000 | 9193809999 | 4-0-1 | 6 | RT-ON-SSN | 4 |
| 9194690000 | 9194699999 | 4-0-1 | 6 | RT-ON-SSN | 4 |
| 7704540000 | 7704549999 | 4-0-1 | 6 | RT-ON-SSN | 5 |
| 9105660000 | 9105669999 | 4-0-1 | 6 | RT-ON-SSN | 4 |

| | PARAMETER | SRI | SRI* |
|---|---|---|---|
| | MTP | | |
| 400 | OPC | 2-0-0 | 3-0-0 |
| 402 | DPC | 3-0-0 | 4-0-0 |
| 404 | SIO | SCCP | SCCP |
| | SCCP | | |
| | CGPA | | |
| 406 | PC-SSN | 1-0-0: 7 | 1-0-0: 7 |
| 408 | RI | RT-ON-SSN | |
| | CDPA | | |
| 410 | PC-SSN | 6 | 6 |
| | GTD | 7704545731 | 7704545731 |
| 412 | TT | 10 | 10 |
| 414 | GTI | 4 | 4 |
| 416 | NP | 1 | 1 |
| 418 | NAI | 3 | 3 |
| 420 | RI | RT-ON-GT | *RT-ON-SSN* |
| | TCAP / MAP | | |
| 422 | MSISDN NP | 1 | 1 |
| 424 | MSISDN NAI | 3 | 3 |
| 426 | MSISDN DIGITS | 7704545731 | 7704545731 |
| 428 | MSRN NP | -- | -- |
| 430 | MSRN NAI | -- | -- |
| 432 | MSRN DIGITS | -- | -- |
| 434 | PORT STATUS | -- | -- |

|  | M2 | M3 |
|---|---|---|
| PARAMETER | SMS | SMS* |
| MTP | | |
| OPC | 2-0-0 | 3-0-0 |
| DPC | 3-0-0 | 5-0-0 |
| SIO | SCCP | SCCP |
| SCCP | | |
| CGPA | | |
| PC-SSN | 1-0-0: 7 | 1-0-0: 7 |
| RI | RT-ON-SSN | RT-ON-SSN |
| CDPA | | |
| PC-SSN | 6 | 6 |
| GTD | 9193803414 | 9194326567 |
| TT | 10 | 10 |
| GTI | 4 | 4 |
| NP | 1 | 1 |
| NAI | 3 | 3 |
| RI | RT-ON-GT | *RT-ON-GT* |
| TCAP / MAP | | |
| MSISDN NP | 1 | 1 |
| MSISDN NAI | 3 | 3 |
| MSISDN DIGITS | 9193803414 | 9193803414 |

Figure 13

|  | M2 | M3 |
|---|---|---|
| PARAMETER | SMS | SMS* |
| MTP | | |
| OPC | 2-0-0 | 3-0-0 |
| DPC | 3-0-0 | 4-0-1 |
| SIO | SCCP | SCCP |
| SCCP | | |
| CGPA | | |
| PC-SSN | 1-0-0: 7 | 1-0-0: 7 |
| RI | RT-ON-SSN | RT-ON-SSN |
| CDPA | | |
| PC-SSN | 6 | 6 |
| GTD | 9193800001 | 9193800001 |
| TT | 10 | 10 |
| GTI | 4 | 4 |
| NP | 1 | 1 |
| NAI | 3 | 3 |
| RI | RT-ON-GT | *RT-ON-SSN* |
| TCAP / MAP | | |
| MSISDN NP | 1 | 1 |
| MSISDN NAI | 3 | 3 |
| MSISDN DIGITS | 9193800001 | 9193800001 |

Figure 15

METHODS AND SYSTEMS FOR ROUTING MESSAGES ASSOCIATED WITH PORTED SUBSCRIBERS IN A MOBILE COMMUNICATIONS NETWORK

RELATED APPLICATION INFORMATION

This application is a continuation-in-part of U.S. patent application Ser. No. 09/471,946 filed Dec. 23, 1999, and further claims the benefit of U.S. Provisional Patent Application No. 60/177,523 filed Jan. 21, 2000, the disclosures of each of which are incorporated herein by reference in their entirety.

TECHNICAL FIELD

The present invention relates to the routing of signaling messages in a communications network, and, more particularly, to methods and systems for processing and routing signaling messages associated with ported subscribers in a wireless communication network.

BACKGROUND ART

Within the global wireless telecommunications industry, the current trend in network technology is divided between global system for mobile communications (GSM) and ANSI-41 based architectures. In many respects, GSM and ANSI-41 based networks are quite similar, with the primary differences between the two technologies simply relating to the protocols used to communicate between the various network entities, and the operating frequencies of the communication handsets themselves. As such, in the interest of clarity, discussions of the present invention will henceforth be limited to GSM type network implementations. However, it should be appreciated that the present invention could be similarly practiced in an ANSI-41, Personal Communication Services (PCS) or similar type network.

A typical GSM network architecture is illustrated in FIG. 1. As shown in FIG. 1, the typical GSM network, generally indicated by the numeral 100, incorporates a number of functional elements or nodes which are appropriately interconnected so as to obtain the desired overall network service. These network nodes include a first mobile switching center 110, a gateway mobile switching center 112, a first home location register (HLR) 114, a second home location register 116, a visitor location register (VLR) 118, and a second MSC 120. Briefly, an HLR is a database that is used to store subscriber information for all customers within the home service area of the GSM service provider. Functionally, an HLR is linked through a signaling network to other service areas such that subscriber information may be efficiently shared between geographically diverse networks, a characteristic that facilitates seamless internetwork roaming. Like an HLR node, a VLR node is also a database that contains subscriber information. However, a VLR is specifically used to store information related to subscribers who are not in their home service area. More particularly, a VLR is where roaming related data for a customer is stored when the customer activates their handset outside of their designated home service area.

Again, the network elements described above (HLR and VLR) can be thought of as essentially databases or database processing nodes. Unlike these database nodes, MSCs and GMSCs are generally identified as network switching elements. Among their many functions, MSCs and GMSCs are responsible for determining which cell site will take possession of a call. Such hand off control is facilitated by a communication link between an MSC and an associated Base Station Controller (BSC)/Base Transceiver Station (BTS) pair (not shown). A GMSC node typically has the added distinction of providing connectivity to one or more HLR nodes; otherwise, MSC and GMSC functionality is very similar.

As generally illustrated in FIG. 1, GMSC 112 is coupled via signaling links to two HLR database nodes 114 and 116 described above, and as such, all signaling message access to these database nodes is controlled and administered by GMSC 112. Of particular relevance to the present invention are the signaling aspects of the GSM network described above, especially those aspects associated with the signaling interactions between HLR, VLR and MSC or GMSC type nodes. A more detailed explanation of HLR, VLR and GMSC operation is provided below.

Within a GSM wireless communication network, each mobile station handset is assigned a unique identification number known as an International Mobile Subscriber Identity (IMSI) identification number. In the case of European GSM-type network implementations, the IMSI code is typically associated with a particular telephone handset. In such networks, each user can also be assigned one or more Mobile Station Integrated Services Digital Network (MSISDN) numbers. In the wireless telecommunications industry, MSISDN numbers are analogous to the 10 digit telephone numbers in a conventional North American wired network. The fact that multiple MSISDN numbers can be associated with a single IMSI number indicates that more than one MSISDN number can be assigned and used to reach a single mobile station handset. It should be appreciated that in this disclosure, the term "Mobile Identification Number" (MIN) is used generically to refer to IMSI, MSISDN, Mobile Global Title, ANSI-41 Mobile Identification Numbers (MIN) and Mobile Directory Numbers (MDN), and other identification numbers associated with subscribers or services in a wireless communication network.

In any event, an MSISDN number is dialed whenever a user wants to communicate with a particular mobile station handset. As indicated in FIG. 1, GMSC 112, by analyzing a part of the dialed MSISDN number, determines the particular HLR that is storing routing information associated with the called mobile station. By retrieving and utilizing such routing information, the GSM network is able to locate the called mobile station in response to a call attempt so that a call connection can be established between the calling party and the called mobile station. It should also be appreciated that, depending on the nature of the call or signaling event, a GMSC may analyze and direct an HLR lookup based on either the IMSI or MSISDN number associated with the called or calling party.

In the particular example presented in FIG. 1, MSC 110 launches an ISDN user part (ISUP) initial address message (IAM) (message 1) in an attempt to establish a call originated by a mobile subscriber that is being serviced by MSC 110. Those skilled in the art of mobile communication networks will appreciate that an ISUP IAM message is one of many signaling messages that are employed in a signaling system 7 (SS7) based signaling network to facilitate the setup of a telephone call. A detailed discussion of SS7 signaling message types and their associated function can be found in *Signaling System #7* by Travis Russell, McGraw-Hill Publishing 1998. Additionally, a detailed discussion of SS7 related signaling within a GSM network can be found in *The GSM System for Mobile Communications* by Michel Mouly and Marie-Bernadette Pautet, Cell & Sys 1992.

Returning to a discussion of FIG. 1, it will be appreciated that ISUP IAM message (1) is received by GMSC 112, which in turn analyzes the message. More particularly, GMSC 112 examines the MSISDN value associated with the called party, as well as service indication information contained in the message. Shown in FIG. 2 is a simplified routing database table 150 contained within GMSC 112. This sample GMSC routing database table 150 is keyed or indexed based on a block or range of MSISDN numbers 152. Associated with each block or range of MSISDN numbers is an address or identifier 154 of an associated HLR node.

Returning to FIG. 1, GMSC 112 performs a lookup in HLR routing table 150, determines that this message should be delivered to HLR 114, and subsequently formulates a send routing information (SRI) request message 2. Upon receipt of SRI message 2, HLR 114 examines the message and, in one case, determines that there is not enough information available to determine the appropriate routing address that is needed to deliver the original ISUP IAM message 1 to its destination. However, in such a scenario, HLR 114 is able to determine the routing address of a VLR 118 that contains the information necessary to continue the routing of ISUP IAM message 1. This determination is made via a lookup in an internal routing database 156, as shown in FIG. 2. The simplified sample HLR routing database 156 is keyed or indexed by MSISDN number 158 and includes a pointer or address 160 to a VLR node that is currently servicing each MSISDN entry. Consequently, HLR 114 formulates a Provide Routing Number (PRN) message 3, and addresses this message to VLR 118. The VLR 118, upon receipt of the PRN message 3, performs a database lookup based on the called party MSISDN and subsequently returns a mobile station roaming number (MSRN) which is used to identify the MSC that is currently servicing the called party. A simplified, sample VLR database 162 is shown in FIG. 2. VLR database 162 is keyed or indexed by MSISDN number 164, and includes an MSRN 166 that is associated with each MSISDN entry. Returning to FIG. 1, the MSRN value extracted from VLR database 162 is included in a PRN result or acknowledge (PRN Ack) message 4 that is formulated by the VLR 118 and returned to the interrogating HLR 114. Upon receipt of the PRN Ack message 4, HLR 114 formulates an SRI Acknowledge (SRI Ack) message 5 that serves as a response to the original SRI message 2. SRI Ack message 5 includes the MSRN that was provided by the VLR 118, and is delivered to the originator of the SRI message 2, GMSC 112. GMSC 112 receives the SRI Ack message 5 and uses the MSRN value contained therein to modify the routing label of the original ISUP IAM message 1. A modified ISUP IAM message 6 is subsequently produced which is addressed to the MSC that is currently serving the called party.

Again, it will be appreciated that the example presented above is a simple call setup scenario, intended primarily to illustrate the basic call setup and associated message flow processes associated therewith. Significantly more complicated call setup scenarios may be encountered in real world network implementations. Also, not all signaling messages received by a GMSC are necessarily directly related to call setup and teardown operations, and hence would not necessarily follow the same processing steps as described in the ISUP IAM call setup example presented above.

In the sample scenario illustrated in FIG. 1, HLR 114 and HLR 116 are each configured to service a pre-defined block of subscriber MSISDN numbers. In general, a specific series or block of MSISDN (or IMSI) numbers are pre-assigned to each HLR in a service provider's network, as further indicated by routing table 150 in FIG. 2. Again, it should be appreciated that the HLR database 156 and GMSC routing table 150 structures shown in FIG. 2 are merely illustrative of the high level information storage concept and are not intended to represent the actual data structures that would typically be implemented in such network nodes. In many cases, service providers are not able to alter these blocks of assigned numbers within a given HLR unit because of routing limitations of the GMSC associated with the HLR unit. Consequently, service providers have no opportunity to dynamically re-allocate their MSISDN number base across multiple HLRs, so as to more efficiently utilize existing HLR resources (i.e., load sharing). It should be noted that this limitation is typically the result of routing table restrictions in the MSCs, and generally not database storage restrictions in the HLRs. That is, although HLRs can generally be populated so as to contain subscriber data entries for any IMSI or MSISDN number, GMSCs are typically only capable of routing messages based on an IMSI or MSISDN block in which the message's IMSI or MSISDN number falls. These IMSI or MSISDN blocks are comprised of a sequential range of IMSI or MSISDN numbers. Thus, it is the limited routing capability of a GMSC that causes the problem, and typically not the HLR nodes.

For instance, in FIG. 1, all traffic relating to calls associated with an MSISDN number between 9199670000 and 9199679999 will be routed to HLR A 114 by the associated GMSC 112. As the service provider begins to acquire more and more customers (i.e., assigning more and more of the MSISDN numbers in the allocated block or series 9199670000 to 9199679999), the traffic or congestion experienced at HLR A 114 node will increase accordingly.

Now consider that a service provider owning HLR A 114 illustrated in FIG. 1 has acquired so many new customers that it is decided to invest in an additional HLR B 116. At the time of implementation HLR B 116 is populated with MSISDN number block 9194690000–9194699999. HLR B 116 is linked to the adjacent GMSC 112 and activated so as to service any calls corresponding to the pre-programmed MSISDN block.

The major shortcoming of range-based routing associated with such multiple HLR configurations can now be more fully appreciated. Despite the addition of the new HLR resource capacity represented by unit B, all call traffic associated with MSISDN numbers 9199670000–9199679999 must still be handled by a single HLR, HLR A 114. Even if the service provider has no customers within the MSISDN 9194690000–9194699999 number range, it is not possible for the service provider to dynamically re-allocate or re-distribute the "fully assigned" 9199670000–9199679999 MSISDN number block among the unused HLR B 116 unit. Thus, it is possible that a network service provider will be forced to operate in a situation where traffic to HLR A 114 is highly congested, while the HLR B 116 resource is completely unused. This can lead to less than efficient usage of installed resources, as it would be more efficient to load balance or share traffic more equally among the two HLR units.

It should be appreciated that, in addition to the load sharing concerns, there are similar issues and similar needs that arise when considering the porting of subscribers from one service provider to another, otherwise known as number portability (NP). Once again, one of the central problems facing a network operator in such a scenario is the ability to freely distribute subscriber information among multiple HLR nodes. With particular regard to the case of mobile number portability, it will be appreciated that ported mobile subscribers may either be ported "in" to an operator's network from a competing carrier, or ported "out" of an operator's network to a competing carrier. Consider the simplified network presented in FIG. 1 with regard to such an "in-ported" scenario. That is, the owner of network 100 acquires a new mobile subscriber that was formerly a customer of a competing network operator. For the purposes of example, assume that this new mobile subscriber has an MSISDN number of (919) 345-7015 and wishes to keep this same MSISDN number in the new operator's network. By default, this new subscriber's information would be stored and maintained in HLR A, as generally indicated by GMSC routing table 150 shown in FIG. 2. Consequently, when a signaling message associated with the new mobile subscriber that requires HLR access is received by GMSC 112, a lookup is performed in GMSC routing table 150 and the message is subsequently routed to HLR A 114. It will be again be appreciated that due to the range-based routing table configuration of GMSC 112, flexible allocation of in-ported mobile subscribers among available HLR resources is significantly impaired.

With regard to "out-ported" subscribers or mobile subscribers that have been ported out of a service provider's network, the same flexible HLR allocation limitations exist due to the range-based routing table configuration in GMSC 112. Furthermore, in the case of a signaling message associated with a mobile subscriber that has been ported out of a service provider's network, it will be appreciated that processing of the signaling message by one of the operator's HLR nodes is no longer necessary. That is, since the subscriber has been ported out of the service provider's network, the service provider's network is no longer considered to be the mobile subscriber's "home" and, consequently, the service provider's home location registers (HLRS) no longer need to store information associated with the mobile subscriber. However, as generally indicated in FIGS. 1 and 2, despite elimination of the out-ported subscriber's information from the service provider's HLR resources, GMSC 112 will continue to route signaling messages associated with the mobile subscriber to one of the service provider's HLR nodes.

Consider the case of an out-ported mobile subscriber with an MSISDN number of (919) 967-2000. When GMSC 112 receives a signaling message associated with the out-ported subscriber, a lookup is performed in routing table 150 and the signaling message is subsequently routed to HLR A 114 despite the fact that information for that mobile subscriber is no longer maintained in HLR A. Such unnecessary routing constitutes an inefficient use of both routing and HLR database resources.

Therefore, what is needed is a system and method of efficiently redirecting signaling messages associated with both in and out-ported mobile subscribers among HLR, equipment identity register (EIR), authentication center (AuC), short message service center (SMSC), and other similar signaling database type nodes, where message routing occurs in such a way as to preserve compliance with existing industry standard network management signaling protocols.

DISCLOSURE OF THE INVENTION

According to one aspect, the present invention includes a porting control routing (PCR) node that is adapted to efficiently route signaling messages associated with a mobile subscriber that has been either ported into or out of a service provider's wireless communication network. The PCR node includes a communication module capable of transmitting and receiving data packets over a network. A range-based database contains range-based rule records indexed by blocks of identification numbers. An exceptions-based database contains exception-based rule records indexed by either a single identification number or a sub-block of identification numbers. In one embodiment, the exceptions-based database includes database node entity address information, routing number information, and ported status information for each identification number or identification number sub-block entry in the database. A database subsystem controller accesses at least one of the databases to extract routing information for the data packet. Because the PCR node includes both range- and exception based databases, flexibility in allocating mobile identification numbers among multiple HLRs is increased. Furthermore, the association of a ported status indicator and related routing information with entries in the exception based database allow the PCR node of the present invention to more efficiently utilize a service provider's network resources.

Accordingly, it is an object of the present invention to provide a PCR node that is adapted to perform both range- and exception-based database lookups.

It is another object of the present invention to provide a PCR node that is adapted to maintain ported status information associated with a mobile subscriber.

It is another object of the present invention to provide a PCR node that is adapted to use stored ported status information associated with a mobile subscriber to determine, at least in part, where a signaling message should be routed.

It is another object of the present invention to provide a PCR node that is adapted to prevent a signaling message associated with mobile subscriber that has been ported out of a service provider's network from unnecessarily accessing the service provider's HLR resources.

It is another object of the present invention to provide a PCR node that is adapted to facilitate non-sequential MSISDN block or range based allocation of mobile subscriber information among multiple home location register (HLR) nodes.

It is another object of the present invention to provide a PCR node that is adapted to facilitate signaling message traffic or load sharing among multiple home location register (HLR) nodes.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 5a is a table illustrating a GSM mobile number portability (G-Port™) exceptions-based data table structure.

FIG. 5b is a table illustrating a range-based data table structure.

FIG. 13 is a table illustrating parameter values in an original SRI-SMS message and a modified SRI-SMS message associated with an SMS communication to a mobile subscriber that has been ported out of a service provider's network.

FIG. 15 is a table illustrating parameter values in an original SRI-SMS message and a modified SRI-SMS message associated with an SMS communication to a mobile subscriber that has not been ported out of a service provider's network.

DETAILED DESCRIPTION OF THE INVENTION

Figure 1:
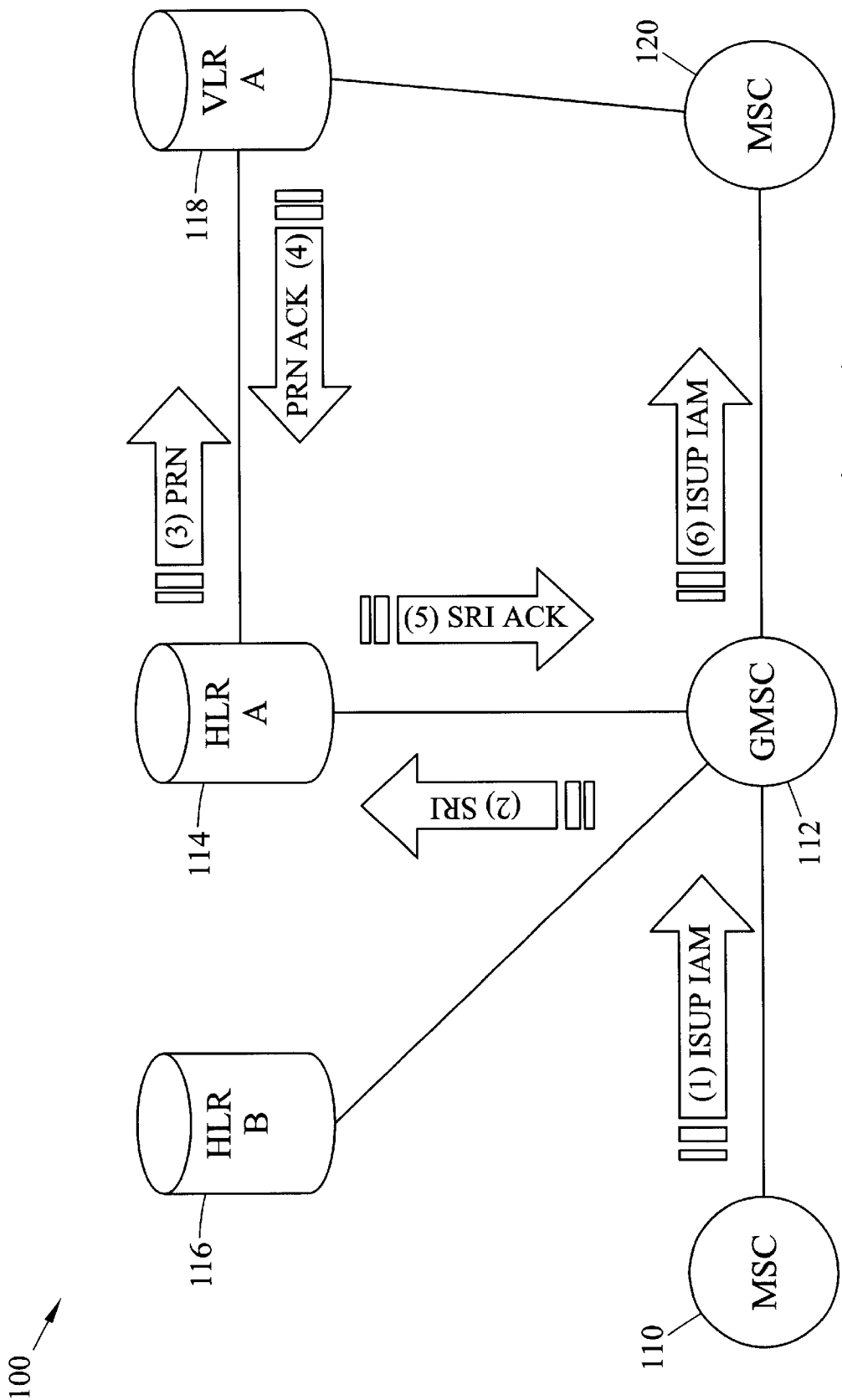
FIG. 1 is a diagram illustrating a prior art mobile telecommunication network architecture and associated network elements.
Figure 2:
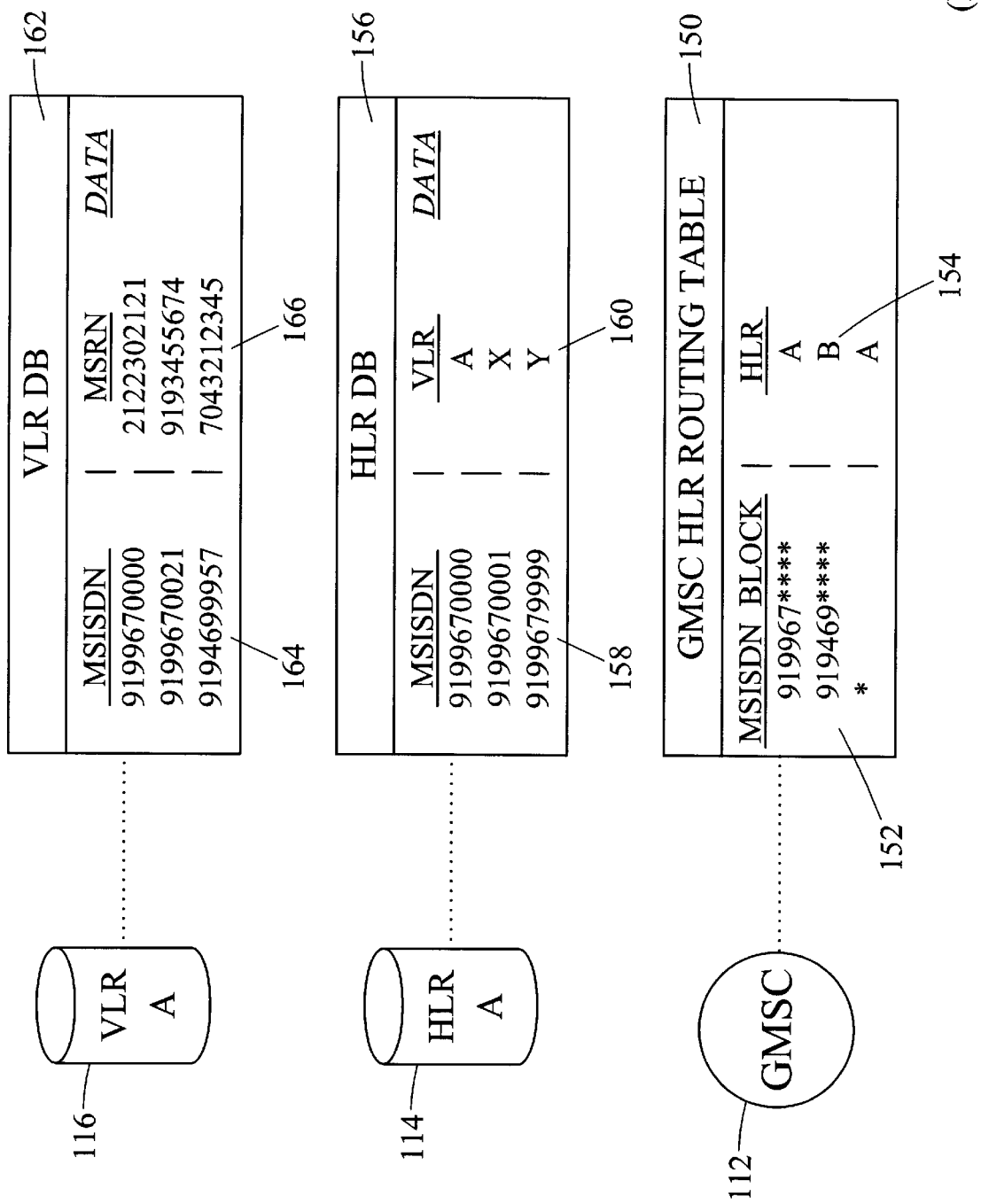
FIG. 2 is a diagram illustrating sample routing information maintained by several mobile telecommunication network elements.
Figure 3:
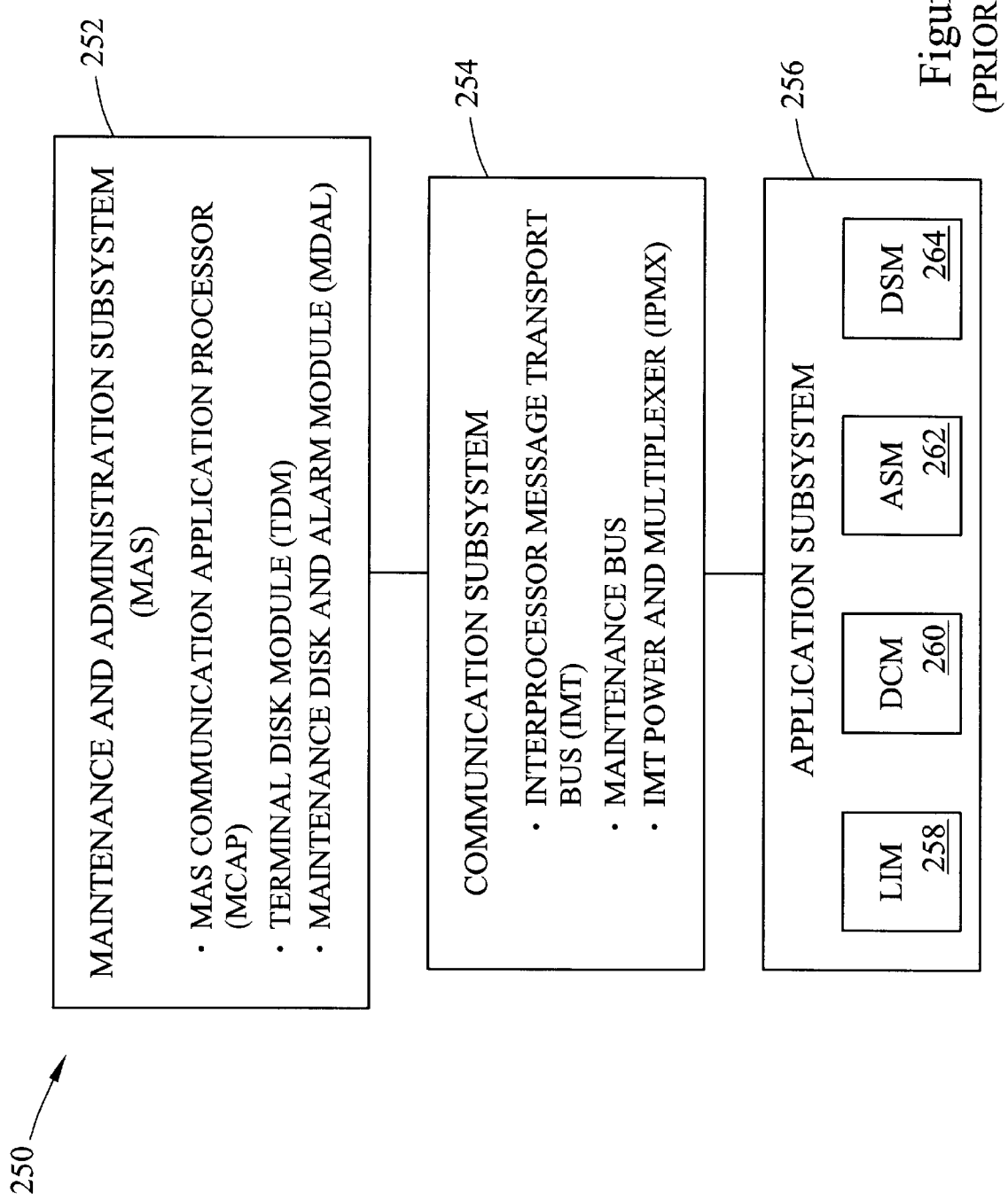
FIG. 3 is a schematic diagram of a prior art signal transfer point (STP) switching node.

Disclosed herein are several embodiments of the present invention, all of which include a network element that performs functions similar to that of a telecommunications network packet routing switch, such as a signal transfer point (STP) or a signaling gateway (SG) routing node. As used herein, the term "signaling gateway" refers to a packet routing node capable of routing call signaling messages between nodes of different protocols, such as SS7 nodes and IP nodes. Each of the embodiments described below employs an internal architecture similar to that of high performance STP and SG products which are marketed by the assignee of the present application as the Eagle® STP and IP$^7$ Secure Gateway™, respectively. A block diagram that generally illustrates the base internal architecture of the IP$^7$ Secure Gateway™ product is shown in FIG. 3. A detailed description of the IP$^7$ Secure Gateway™ may be found in Tekelec publication PN/909-0767-01, Rev B, August 1999, entitled *Feature Notice IP$^7$ Secure Gateway™ Release* 1.0 published by Tekelec, the disclosure of which is incorporated herein by reference in its entirety. Similarly, a detailed description of the Eagle® STP may be found in the *Eagle® Feature Guide* PN/910-1225-01, Rev. B, January 1998, the disclosure of which is incorporated herein by reference in its entirety. As described in the above referenced Feature Notice, an IP$^7$ Secure Gateway™ 250 includes the following subsystems: a maintenance and administration subsystem (MAS) 252, a communication subsystem 254 and an application subsystem 256. MAS 252 provides maintenance communications, program load, peripheral services, alarm processing and system disks. Communication subsystem 254 includes an interprocessor message transport (IMT) bus that is the main communication bus among all subsystems in the IP$^7$ Secure Gateway™ 250. This high-speed communications system functions as two 125 Mbps counter-rotating serial buses.

Application subsystem 256 includes application cards that are capable of communicating with the other cards through the IMT buses. Numerous types of application cards can be incorporated into SG 250, including but not limited to: a link interface module (LIM) 258 that provides SS7 links and X.25 links, an data communication module (DCM) 260 that provides a TCP/IP interface to an external monitoring device over Ethernet, and an application service module (ASM) 262 that provides global title translation, gateway screening and other services. A database service module (DSM) 264 may also be provided to support number portability service. It should be appreciated that, in addition to conventional SS7 LIM cards, one or more DCM cards can be employed in a similar manner to provide for the transport of Internet Protocol (IP) encapsulated SS7 messages over an IP network, as described in the above referenced *Feature Notice IP$^7$ Secure Gateway™ Release* 1.0 publication. The specific functional components of an IP$^7$ Secure Gateway™ for transmitting and receiving transaction capabilities application part (TCAP) messages over an Internet Protocol (IP) network are described in commonly-assigned, co-pending International Patent Publication No. WO 00/35155, the disclosure of which is incorporated herein by reference in its entirety. Similarly, the functional components of an IP$^7$ Secure Gateway™ for transmitting and receiving ISDN user part (ISUP) messages over an Internet Protocol (IP) network are described in commonly-assigned, co-pending International Patent Publication No. WO 00/35156, the disclosure of which is also incorporated herein by reference in its entirety.

Porting Control Routing Node Internal Architecture

Figure 4:
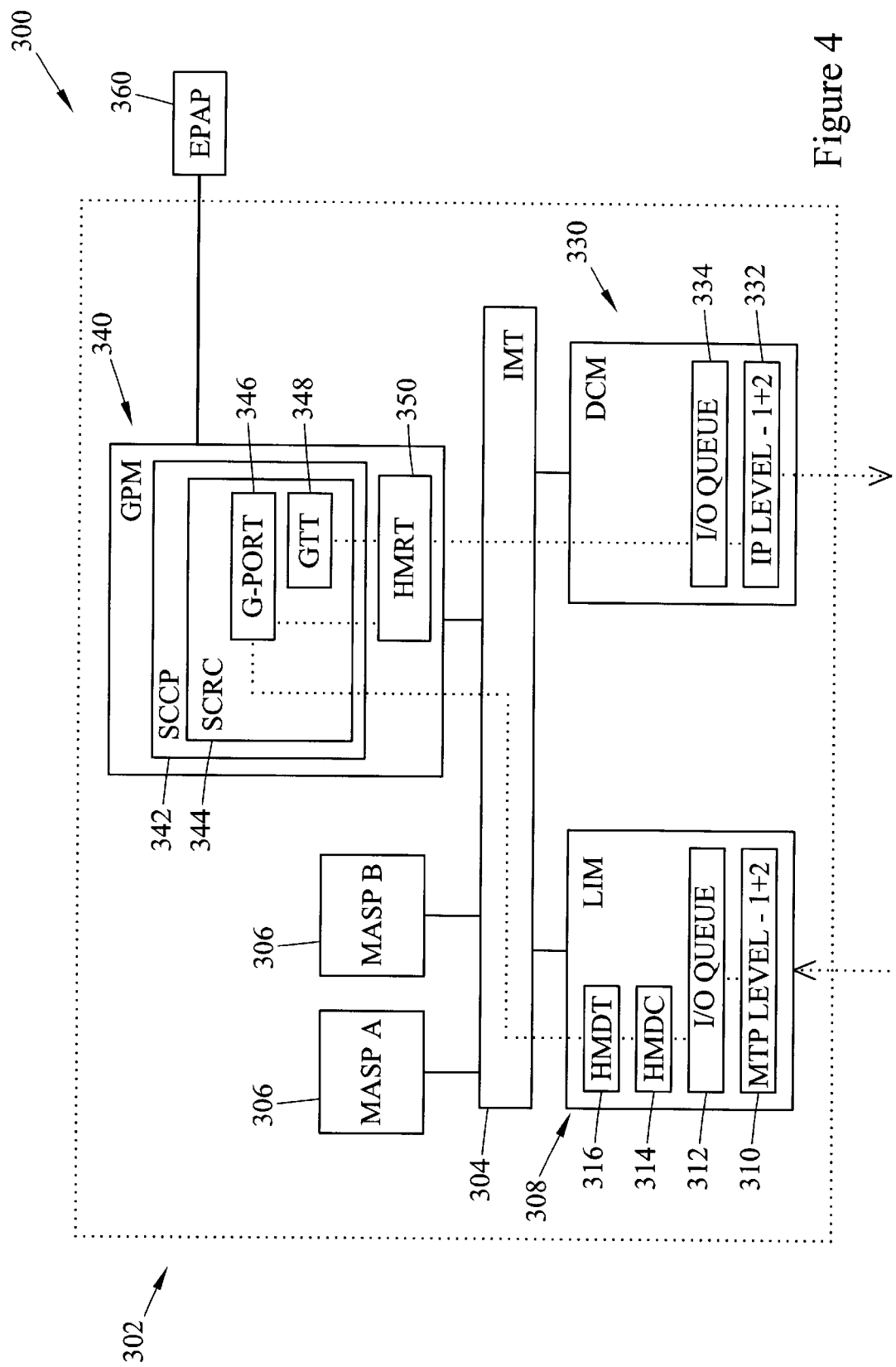
FIG. 4 is diagram illustrating an internal architecture of a porting control routing (PCR) node of the present invention, illustrating message flow associated with an exceptions-based routing database lookup.

Presented in FIG. 4 is one embodiment of a porting control routing (PCR) node of the present invention, generally indicated by the numeral 302. PCR 302 includes an interprocessor message transport (IMT) bus 304 that is the main communication bus among all internal subsystems within switch or routing node. In one embodiment, this high-speed communications system functions as two 125 Mbps counter-rotating serial buses. Communicatively coupled to IMT bus 304 are a number of distributed processing modules or cards including: a pair of maintenance and administration subsystem processors (MASPs) 306, an SS7 capable link Interface module (LIM) 308, an Internet protocol (IP) capable data communication module (DCM) 330, and a G-Port™ service module (GPM) 340. These modules are physically connected to IMT bus 304 such that signaling and other types of messages may be routed internally between all active cards or modules. For simplicity of illustration, only single LIM, DCM, and GPM cards are included in FIG. 4. However, it should be appreciated that the distributed, multi-processor architecture of the PCR node 302 facilitates the deployment of multiple LIM, DCM, GPM and other cards, all of which could be simultaneously connected to and communicating via IMT bus 304.

MASP pair 306 is adapted to provide maintenance communications, initial program load, peripheral services, alarm processing and system disks. Because MASP pair 306 is not particularly relevant to a discussion of PCR functionality, a detailed discussion of the design and operation of MASP pair 306 is not provided herein. For a comprehensive discussion of additional MASP operations and functionality, the above-referenced Tekelec IP[7] Secure Gateway™ and Eagle® STP publications can be consulted.

Focusing now on LIM card functionality, in the illustrated embodiment LIM 308 is comprised of a number of sub-components including, but not limited to: an SS7 MTP level 1 and 2 layer process 310, an I/O buffer or queue 312, an SS7 MTP level 3 layer HMDC process 314, and an HMDT process 316. MTP level 1 and 2 layer process 310 provides the facilities necessary to send and receive digital data over a particular physical media/physical interface, as well as to provide error detection/correction and sequenced delivery of all SS7 message packets. I/O queue 312 provides for temporary buffering of incoming and outgoing signaling message packets. MTP level 3 HMDC process 314 performs a discrimination function, effectively determining whether an incoming SS7 message packet requires internal processing or is simply to be through switched, i.e., routed to another node. In one embodiment, HMDC process 314 examines a service indicator octet (SIO) value in the received message packet in order to determine whether internal signaling connection control part (SCCP) processing is required. HMDT process 316 handles the internal routing of SS7 message packets that require additional processing prior to final routing.

DCM 330, shown in FIG. 4, includes an Internet protocol (IP) lower level protocol process 332 and an I/O queue 334 perform functions that are analogous to their SS7-based LIM counterparts described above. It should be appreciated that outgoing SS7 message packets routed through the DCM 330 will be transmitted out of the PCR node 302 and into an Internet protocol (IP) network. As the SS7/Message Transfer Part (MTP) communication protocol and the IP communication protocol are not inherently compatible, all SS7 message packets that are to be transmitted via an IP network must first be encapsulated within an IP routing envelope prior to transmission. In one embodiment, this IP encapsulation is performed by the IP process 332. Again, in such a design scenario, the IP process 332 is the IP protocol equivalent of the SS7 MTP level 1–2 layer process 310 of the LIM module 308. It will be appreciated that the message packets received and transmitted by a DCM card may include transport adapter layer interface (TALI) protocol messages, session initiation protocol (SIP), M2UA, SS7 MTP3 user adaptation layer (M3UA), SS7 SCCP user adaptation layer (SUA), H.323 or other signaling protocols that may be transported via TCP/IP or similar IP based protocols. Preferred packet formats for encapsulating various types of SS7 messages in IP packets are described in Internet Engineering Task Force (IETF) INTERNET DRAFT <draft-benedyk-sigtran-tali-01.txt> entitled Transport Adapter Layer Interface, Jun. 20, 2000, the disclosure of which is incorporated herein by reference in its entirety. Furthermore, the TALI protocol is also described in detail in commonly-assigned, co-pending International Patent Publication No. WO 00/76134, the disclosure of which is incorporated herein by reference in its entirety. Again, it will be appreciated that the concepts described in this disclosure are not dependent on the above referenced TALI signaling protocol. Other functionally similar signaling protocols may be employed within the scope of the present invention, including for example, the IETF SUA/M3UA protocol.

Once again, the description of LIM and DCM sub-components provided herein is limited to those sub-components that are relevant to the sample implementation scenarios illustrated throughout this disclosure. For a comprehensive discussion of LIM and DCM operations and functionality, the above-referenced Tekelec publications can be consulted.

In general, a GPM card provides the control and database processes necessary to perform the required network address translations to achieve the porting control routing functionality implemented by embodiments of the present invention. The GPM 340 shown in FIG. 4 is comprised, in part, of a signaling connection control part (SCCP) sub-module 342, which further includes a G-Port™ subsystem controller known as a signaling connection routing controller (SCRC) process 344. Responsibilities of the SCRC process 344 include, but are not limited to: the directing of an incoming SS7 message packet to either a G-Port™ database process 346 or a global title translation (GTT) database process 348, the modification of a message packet to include routing information returned by the G-Port™ or GTT database processes 346 and 348, respectively, and the creation of a new message packet in response to information returned by the G-Port™ database process 346.

This ability to create a new message in response to information returned from the G-Port™ database is a particularly novel and significant aspect of the present invention. SS7 message packets leaving SCRC process 344 are received and further processed by an HMRT process 350. HMRT process 350 is responsible for the external routing of SS7 message packets that do not require additional processing by the PCR node 302. That is, the HMRT process 350 determines to which LIM or DCM card an SS7 message packet should be routed for subsequent outbound transmission. It will also be appreciated from FIG. 4 that in one embodiment GPM 340 is coupled to and serviced by an external provisioning application platform (EPAP) subsystem 360 via an Ethernet connection. EPAP subsystem 360 is responsible for administration and maintenance of the G-Port™ and GTT databases accessed by processes 346 and 348, respectively.

G-Port™ Service Module Architecture

As identified previously, one problem associated with load sharing and number porting among multiple HLR nodes is that conventional MSCs and GMSCs are only capable of block-based addressing. As such, it will be appreciated that one of the primary objectives of the PCR node according to an embodiment of the present invention is to provide a method by which a network operator can quickly and easily direct signaling messages associated with a given called party to a particular mobile services node (e.g., HLR, VLR, EIR, AuC, SMSC, etc.). To facilitate such signaling message re-direction, the PCR node of the present invention employs a pair of complementary routing databases which effectively map an IMSI, MSISDN, or called party identifier associated with a signaling message to the network address of the appropriate switching point (STP, SG, MSC, etc.) or mobile service node (e.g., HLR, VLR, EIR, AuC, SMSC, etc.). These databases, described above, are referred to as the G-Port™ database, and the GTT database. With regard to the called party identifier, it will be appreciated that such an identifier could include an email address (e.g., jdoe@tekelec.com), uniform resource locator (e.g., www.tekelec.com), Internet protocol (IP) address (e.g., 101.100.100.100 Port 23), or other functionally similar parameter which identifies a called party. Such called party identifiers may be employed in non-SS7 signaling protocol messages, such as a SIP message.

FIGS. 5a and 5b are database structure diagrams which are intended primarily to illustrate the key or indexing structures of sample G Port™ and GTT database tables 370 and 390, respectively. It is understood that the actual G-Port™ and GTT databases may include multiple tables and other data structures. Database tables 370 and 390 are intended to illustrate exemplary database fields used in formulating mobile query response messages according to embodiments of the present invention.

The sample routing rule exceptions-based G-Port™ database table 370 is comprised of several fields including a called party identifier (CPI) key field 372, an entity type indicator key field 374, a point code (PC) field 376, a subsystem number (SSN) field 378, a routing indicator (RI) field 380, an entity address field 382, a routing number (RN) field 384, a number portability (NP) status field 386, an IMSI field 388, and a digit action (D-Action) field 389.

With particular regard to MSISDN key field 372, it should be noted that in an alternate embodiment, the MSISDN key filed could include a continuous range or block MSISDN values. As such, a range or block of MSISDN values may be designated as "exceptions" to the default routing rules defined in the associated GTT database table 390. With regard to the entity type indicator field 374, it will be appreciated that this field enables the G-Port™ database to respond with different routing instructions depending upon the type of mobile service that is required. For instance, an HLR-destined signaling message associated with the MSISDN (919) 380-3414 will obtain different routing instructions from the G-Port™ database than an EIR-destined signaling message associated with the same MSISDN, as indicated in FIG. 5a.

Furthermore, a PCR node of the present invention is adapted to respond differently to different types of messages in certain cases. For instance, in the case of an SRI signaling message associated with a call to a ported subscriber, the PCR node may generate and route a new SRI Acknowledge (SRI Ack) message instead of simply routing or re-directing the original SRI message. The ability to not only route/re-direct signaling messages, but to create new signaling messages based on information stored in the G-Port™ database is a significant aspect of a PCR of the present invention.

The digit action field 389 is provides a mechanism whereby an operator may specify whether routing information obtained from a G-Port™ database lookup for a particular MSISDN entry is used to replace existing global title digit information in the received message, is appended to the existing global title digit information, or is simply not inserted into the received message.

The sample default routing rule GTT database table 390 is comprised of several fields including minimum and maximum MIN key fields 392 and 394, respectively, a point code (PC) field 396, a subsystem number (SSN) field 398, a routing indicator (RI) field 400, and a translation type (TT) field 402.

Again, it should be appreciated that the G-Port™ and GTT database record structures and pseudo data presented in FIGS. 5a and 5b, while supportive of the examples presented in this disclosure, are merely illustrative of the basic information necessary to perform the required routing data lookups. In practice, the actual database record structures and overall database design may vary according to particular implementation and system performance requirements.

The complementary database access scheme employed by the PCR node of the present invention requires that the GTT database table 390 maintain a set of range or block-based default routing rules while the G-Port™ database table 370 contains exceptions to the block-based default routing rules. By range or block-based routing rules, it is meant that a block or range of mobile identification numbers (e.g., IMSI, MSISDN, etc.) are associated with the network address of a particular HLR, EIR, AuC, service control point (SCP), etc. Such a range-based routing rules database structure is similar to the routing database structures commonly employed in conventional GMSC nodes, as described above. Furthermore, a similar complementary default-exception routing database scheme is described in the above-referenced U.S. patent application Ser. No. 09/471,946, filed Dec. 23, 1999, entitled Methods And Systems For Routing Messages In A Communications Network.

Referring to FIG. 5b, the GTT or range-based default database table 390 includes key fields in the left hand column and data fields in the right hand column. The key fields represent ranges of mobile identification or MSISDN numbers associated with a particular node. For example, the first key field specifies a minimum MSISDN value of (919) 380-0000 and a maximum MSISDN value of (919) 380-9999. The routing data fields corresponding to this MSISDN range include a point code (PC) value of 4-0-1, a subsystem number (SSN) value of 6, a routing indicator (RI) value of route on subsystem number (RT-ON-SSN), and a translation type (TT) value of 4. The data included in the data fields are merely illustrative of data fields that can be included in the range-based, default GTT database table 390. Similar key fields and data fields are shown for other sample MSISDN value ranges.

Referring to FIG. 5a, the G-Port™ or exceptions-based database table 370 contains entries that are exceptions to the entries in the range-based default routing database table 390. In FIG. 5a, the left-hand column includes a key MSISDN value, and the right-hand column includes data fields for each MSISDN entry. Again, it should be noted that in an alternate embodiment, the key MSISDN value could include a continuous range or block of "exception" MSISDN values. In the particular example shown in FIG. 5a, the first entry includes a key field MSISDN value of (919) 380-3833 and an entity type key value of "HLR". The data fields corresponding to the first entry include a PC of 4-0-0, an SSN value of 6, an RI value of RT-ON-SSN, a digit action (D-Action) value of "none", an Entity Address 303211234 representing the mobile service entity, HLR A, a number portability status value of "Not Ported", and an associated IMSI identifier value of 9192220000. Again, these data fields are merely illustrative of the data fields that can be included in the exception-based or G-Port™ database table 370.

The dual database architecture employed in the PCR node of the present invention provides a number of subtle benefits to the network operator. For example, the complementary nature of the two databases optimally minimizes routing database memory resource requirements. Furthermore, the task of maintaining and administering the flexible routing node is greatly simplified, in that only exceptions to the conventional block-based routing rules must be explicitly entered into the G-port™ database. If such were not the case and, for example, a particular network operator had data associated with 500,000 mobile subscribers stored in a one or more HLRs, the network operator would be required to create and store at least one unique routing record for each of the 500,000 subscribers. The exceptions-based structure of the flexible routing node database system simply requires, in such a case, that the operator create and store individual routing records in the G-Port™ database only for those MSISDN numbers that do not adhere to the range or block-based rules that have been specified in the GTT database. For example, if a number is ported from one HLR to another HLR, the MSISDN number may be an exception to the block based rules in the second HLR. In the special case where all of the operator's MSISDN numbers adhere to the block-based rules specified in the GTT database, the G-Port™ database would be empty. At the other extreme, where all of the operator's MSISDN numbers do not adhere to the general block-based rules specified in the GTT database, the G-Port™ database would contain at least one entry for each of the operator's assigned MSISDN numbers.

A PCR node according to the present invention facilitates load sharing among multiple HLRs. For example, if a service provider originally has two HLRs in service and subsequently purchases a third HLR, the G-Port™ database allows numbers allocated to the original HLRs to be quickly and easily re-allocated to the third HLR, so as to generally equalize signaling traffic between the three HLR nodes.

G-Port™ Service Module Operation

With particular regard to G-Port™ and GTT translation services, the parameters used either directly or indirectly to determine the type of translation service (e.g., G-Port™ service or GTT service) required by an incoming signaling message include, but are not limited to, a routing indicator (RI), a domain indicator (DI), global title indicator (GTI) parameter, a translation type (TT) parameter, a numbering plan (NP) parameter, and a nature of address indicator (NAI) parameter. For example, in one embodiment, a PCR node may be configured such that a received SS7 signaling message with a GTI value of 4, a TT value of 10, an NP value of 1, and an NAI value of 3 obtains G-Port™ processing. These parameters, their meanings within the context of an SS7 communication network, and their range of values are well known to those skilled in the art and consequently will not be discussed in detail. It should suffice to say that the preferred embodiment of a PCR node of the present invention relies on some or all of these parameters to determine the need for G-Port™ translation service. With particular regard to the domain indicator (DI), it will be appreciated that this value indicates whether the message is in an ANSI or an ITU format, and may further indicate the national or international character of the message. Such information may be obtained by both explicit and implicit means from a received signaling message.

Once the need for G-Port™ processing has been determined, the specific type of translation service or mobile service entity type is next determined. With particular regard to G-Port™ translation services, the types of services available could include GSM services, such as HLR, EIR, AuC, SMSC, etc. Determination of the specific G-Port™ translation service is made through examination of a subsystem number (SSN) parameter that is contained in the SCCP called party address (CdPA) field of the signaling message. Once again, the SSN parameter is well known to those skilled in the art and consequently will not be discussed in detail herein. It should suffice to say that the flexible routing node of the present invention is configured to recognize certain SSN values as indicating the need for a particular type of G-Port™ translation service.

From an operational standpoint, signaling messages requiring routing database processing are first serviced by the exception-based G-Port™ database. That is, a lookup is performed in the G-Port™ database based on the designated mobile service entity type and an MSISDN number associated with the incoming signaling message packet. Assuming that a match is found in the G-Port™ database, it will again be appreciated that subsequent G-Port™ processing will be determined by the type of the original received message. With regard to SS7 transaction capabilities application part (TCAP) based signaling messages, message type may be determined through examination of a TCAP operation (OP) code value contained within the message. In the example scenarios described and discussed herein, send routing information (SRI) and short message service (SMS) message types are employed, and the outcome of G-Port™ processing may vary depending upon which message type is received by the PCR. However, it will be appreciated that many types of signaling messages are defined and currently employed within GSM, PCS, and IS-41 wireless communication networks, and that a PCR node of the present invention may be adapted to accommodate any number of signaling message types.

In any event, if during a lookup operation, an MSISDN and entity type match is located in the G-Port™ database, the appropriate routing data is returned by the G-Port™ database and the signaling message packet is modified accordingly before further routing. No secondary search of the block-based GTT database is required in such a case. However, in the event that no MSISDN match is located in the G-Port™ database, a secondary search is performed in the default range-based GTT database.

G-Port™ Translation

Figure 6:
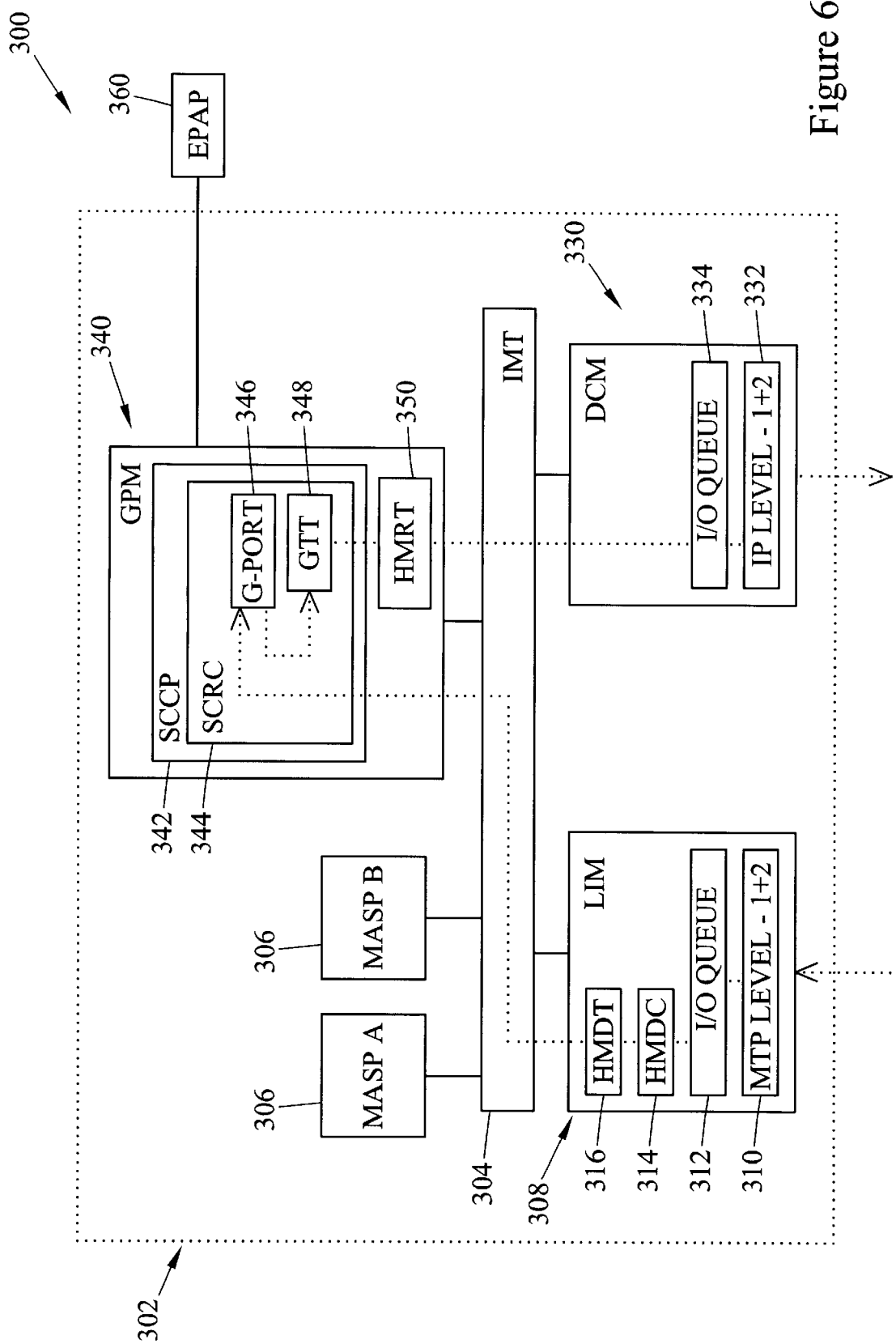
FIG. 6 is diagram illustrating an internal architecture of a PCR node of the present invention, illustrating message flow associated with a default range-based routing database lookup.

FIGS. 4 and 6 generally illustrate the two routing database access scenarios briefly described above, while FIGS. 7a–7c present a flow chart of the associated message processing steps. More particularly, FIG. 4 diagrams the case where the initial G-Port™ database lookup finds an MSISDN and entity type match and hence no secondary GTT database search is required. To illustrate this case, the path of a typical HLR-bound SS7 signaling message is traced through the PCR node 302, with the path being indicated by a dashed line in FIG. 4.

Referring to FIG. 6, beginning at the inbound LIM card 308, a signaling message is received and SS7 MTP Level 1 and 2 processing is performed on the incoming signaling message packet by the MTP Level 1 and 2 process 310. With MTP Level 1 and 2 processing complete, the signaling message packet is temporarily buffered in the I/O queue 312 before being passed up the stack to the MTP Level 3 HMDC process 314. HMDC process 314 examines the signaling message packet and determines whether the packet requires further processing at the PCR node 302. In one embodiment, HMDC process 314 is adapted to examine destination point code (DPC) and service indicator octet (SIO) parameters contained within the message transfer part (MTP) header of an SS7 signaling message packet. In the event that a signaling message includes a DPC value corresponding to the SS7 network address of the PCR node and an SIO value corresponding to that of an SCCP type message, the message is identified as potentially requiring G-Port™ processing. In the example shown in FIG. 4, it is assumed that HMDC process 314 examines the DPC and SIO values associated with the received signaling message and subsequently determines that further processing of the message packet is required. As such, the message packet is passed to the HMDT process 316. The HMDT process 316 examines the packet and determines, which distributed processing module connected to the IMT bus 304 should next receive the packet. In this case, the HMDT process 316 determines that the signaling message should be forwarded to GPM module 340 for G-Port™ processing. The signaling message packet is then placed on the high speed IMT bus 304 and sent to GPM 340.

Figure 7A:
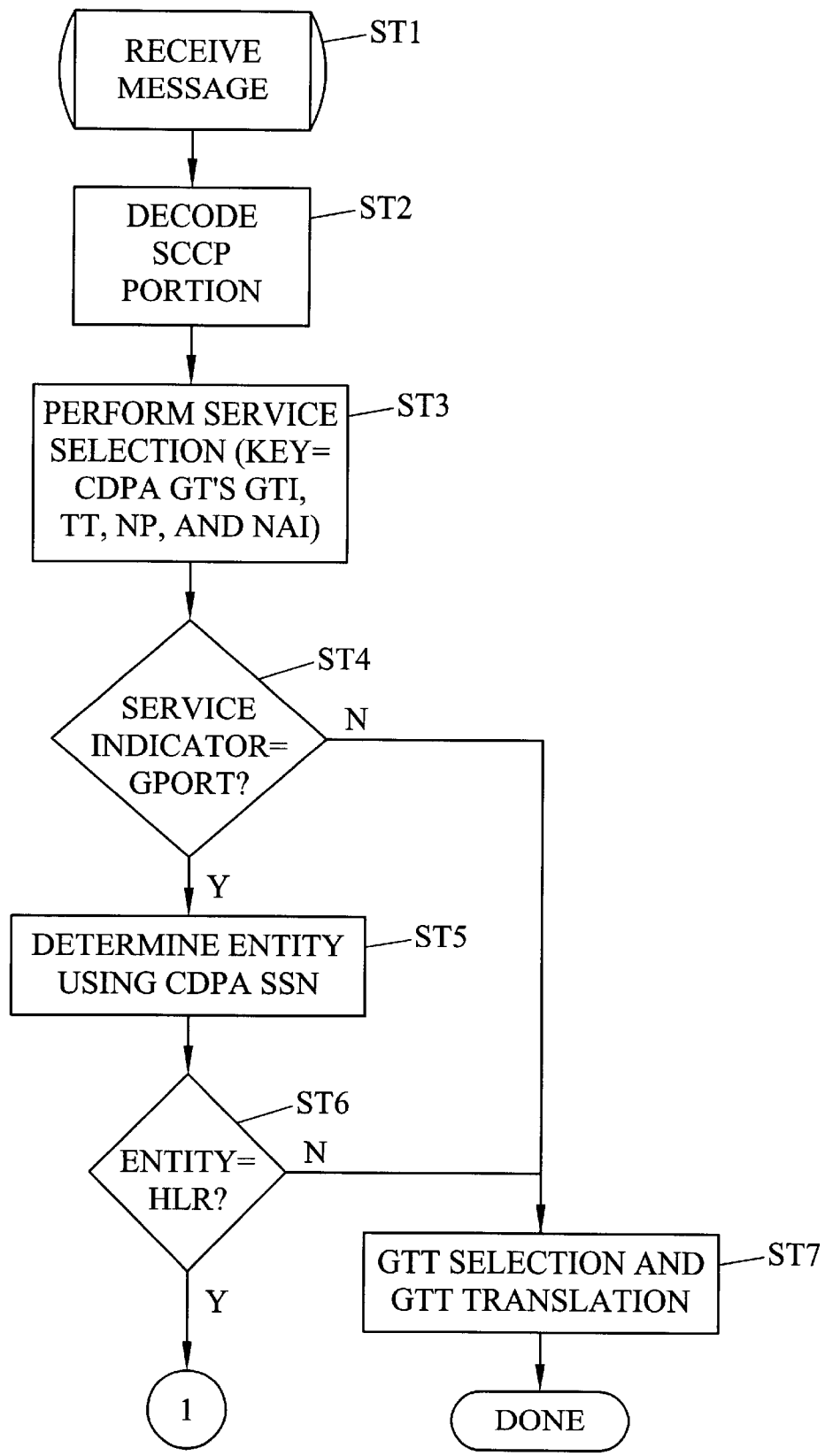
FIGS. 7a–7c are a process flow chart diagram illustrating signaling message processing steps within a PCR node of the present invention.
Figure 7B:
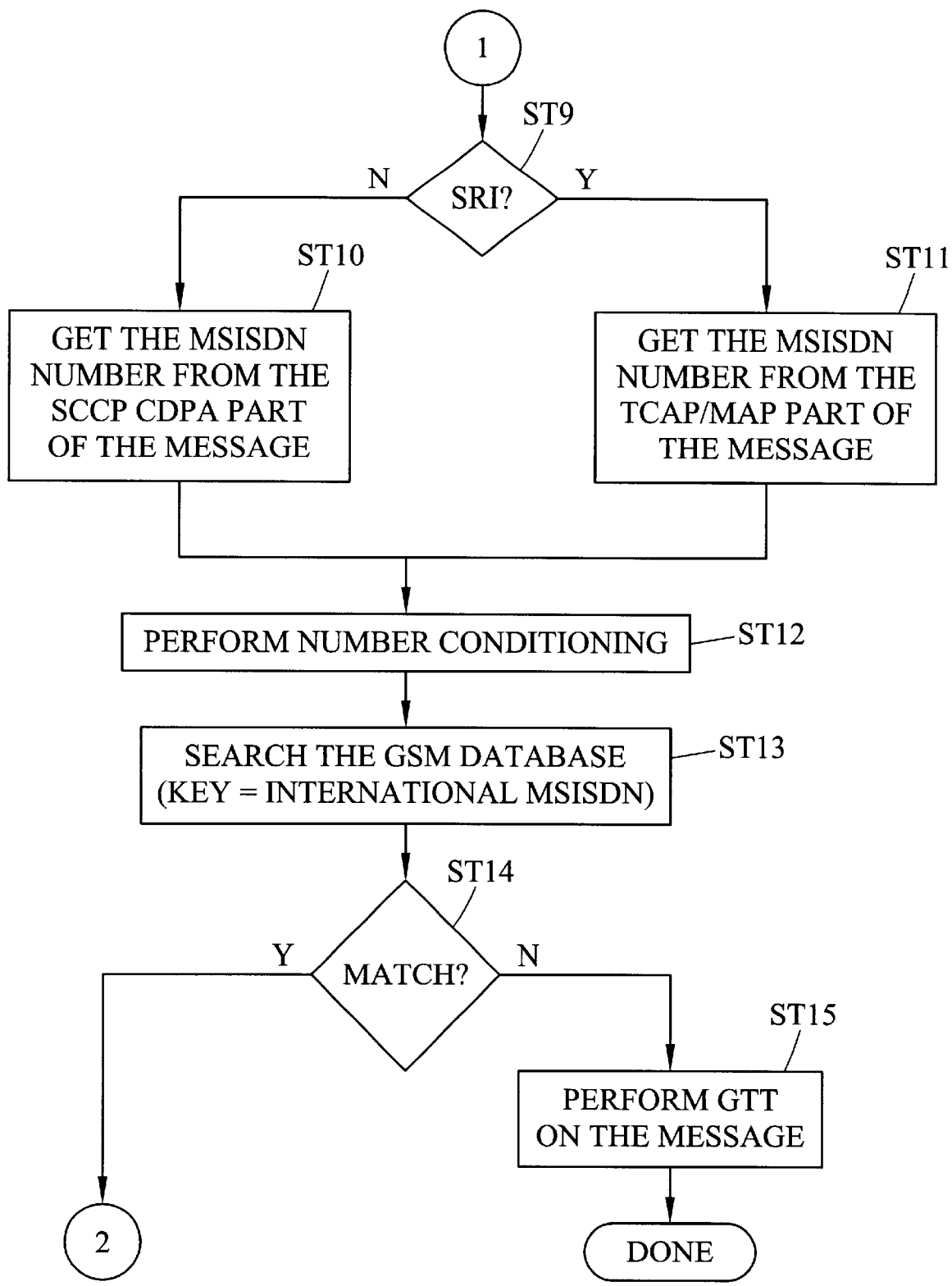
Figure 7C:
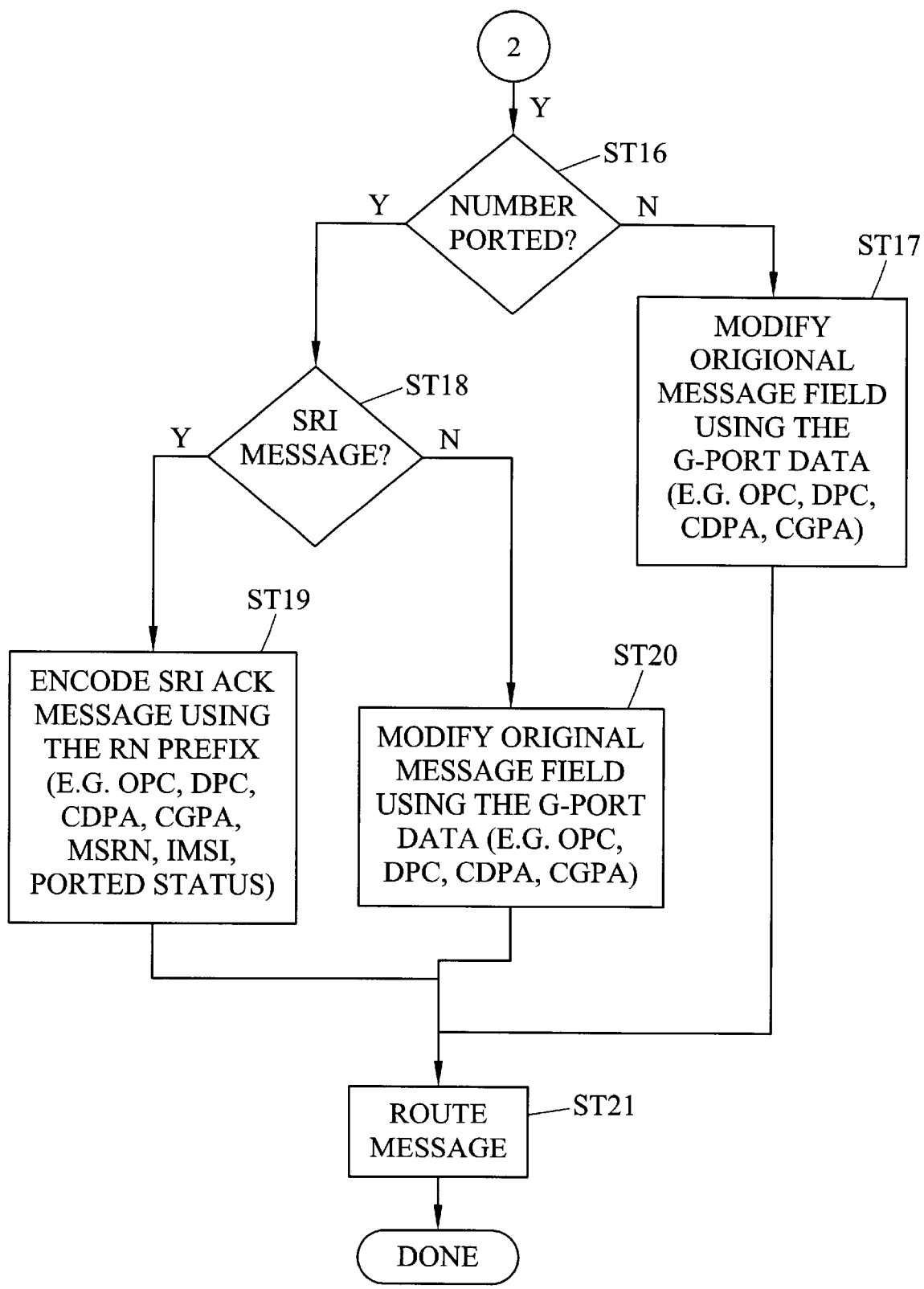

Referring to FIGS. 7a–7c, in step ST1, the signaling message arrives at GPM card 340 and SCCP process 342 receives the packet. Within SCCP process 342, the message packet is passed to the SCRC controller process 344. In steps ST2 and ST3, respectively, SCRC process 328 decodes and examines packet content information contained within the signaling message header in order to establish which type of translation service is required. More particularly, the routing indicator (RI) parameter contained within the signaling message packet is analyzed to determine whether G-Port™ subsystem processing is indicated. In one embodiment, an RI value of "RT-ON-GT" indicates that G-Port™ processing is required.

Assuming an RI value of "RT-ON-GT" is included in the received signaling message, the packet is next passed to G-Port™ process 346 where the GTI, TT, NP, and NAI parameters contained within the signaling message packet are analyzed to determine whether G-Port™ or GTT translation service is required. In the scenario presented in FIG. 4, it is assumed that the received signaling message includes an RI value of "RT-ON-GT", a GTI value of 4, a Translation Type (TT) value of 10, a "national" NAI value of 3, and an "E.164" NP value of 1, and these values are collectively interpreted as indicating the need for a G-Port™ service (ST4). The signaling message content is then further analyzed to determine the specific mobile service entity type or type of G-Port™ translation service required, as indicated by step ST5. More particularly, the CdPA SSN parameter is examined, and the value of 6 is interpreted as indicating the need for a G-Port™ HLR type translation. In this particular example, if the designated mobile service entity type is determined to be anything other than an HLR (i.e., SSN not equal to 6), the packet is passed to the GTT database process 348 as indicated in steps ST6 and ST7, respectively. In processing step ST9, a determination is made with regard to how an MSISDN value should be extracted from the signaling message. In the particular embodiment presented herein, it is assumed that a signaling message packet is either an SRI message or a non-SRI message. As such, if a signaling message is identified as non-SRI (ST10), the MSISDN value is extracted from the SCCP CdPA field of the message. The MSISDN is typically stored within the CdPA field in a structure commonly referred to as the global title digits (GTD) sub-field. If the signaling message is identified as an SRI message (ST11), the MSISDN value is extracted from the TCAP/MAP MSISDN Digits field of the message.

In any event, the MSISDN number encoded within the packet is subsequently examined and conditioned, as necessary (ST12). With particular regard to the above mentioned number conditioning, such processing may be necessary to ensure that the MSISDN is compatible with the format of the key field data stored in the G-Port™ and GTT databases, respectively. Number conditioning operations might include deleting extra prefix digits or pre-pending extra digits to a MSISDN contained within a signaling message packet so as to force the number to conform to an international format. Conversion of a mobile identification number from one numbering standard to another may also be performed. For instance, the MSISDN associated with an incoming signaling message packet may be converted from a first industry standard format known as E.214 to a second industry standard format known as E.212 prior to database lookup operations. Once again, it should be appreciated that such MSISDN conditioning services are necessary only in the case that the format of the incoming message MSISDN is not consistent with the corresponding key field data format in the G-Port™ and GTT databases.

In step ST13, the G-Port™ database is searched using the MSISDN as at least a portion of the search key. In one embodiment, the G-Port™ database may utilize a data table structure similar to table 370 shown in FIG. 5a. The key field structure of G-Port™ data table 370 includes an entity type key field 374, as previously discussed. However, it will be appreciated that in an alternate embodiment of the present invention, G-Port™ database may include multiple data tables, where each table contains data associated with a particular entity type (e.g., HLR, EIR, AuC, SMSC, etc.). With such a database structure, each table could be keyed or indexed on MSISDN values only.

With regard to the G-Port™ database search, it is assumed in the example presented in FIG. 4 that a match is found (ST14) in the G-Port™ database (i.e., there is an entry in the G-Port™ data table 370 corresponding to the message's CdPA SSN value). Processing of the original received signaling message from this point forward depends both on the type of the original received message and the ported status of the MSISDN value associated with the message (ST16). More particularly, if the MSISDN associated with the original received message is determined to have not been ported out of the network being serviced by the PCR node (i.e., not ported, not known to be ported, or ported in), then the routing data returned by the G-Port™ database process is subsequently encoded within the original signaling message packet, as indicated by step ST17, and the modified message is directed from the GPM card 340 via HMRT process 350 to outbound DCM card 330 for transmission from the PCR node (ST21). It will be appreciated that the routing information returned by the G-Port™ database effectively constitutes the network address of an intermediate (e.g., signal transfer point, signaling gateway, packet router, etc.) or final destination node (HLR, EIR, AuC, SMSC, etc.). If, however, the MSISDN associated with the original received message is determined to have been ported out of the network being serviced by the PCR node (ST16), then the next processing step is dependent on the type of the original received message. In one embodiment of the present invention, if the original received message is determined to be a send routing information (SRI) message (ST18) then a new, SRI acknowledge message (SRI Ack) is created and encoded using, in part, the information returned from the G-Port™ database lookup (ST19), and this new message is subsequently routed from the PCR node in a manner similar to that described above. If the original received message is determined to be anything other than an SRI message, then the original message is modified to include the routing information obtained from the G-Port™ database lookup operation, and the modified message is subsequently routed from the PCR node.

Once again, it will be appreciated that with SS7 TCAP-based signaling messages, message type may be determined through examination of a TCAP OP code value contained within the message. In the example scenarios presented above, new message creation is described only for the case of an SRI message associated with a subscriber that has been ported out of the PCR node operator's network. However, it will be appreciated that a PCR node of the present invention may be adapted to trigger the creation of a new signaling message in response to the receipt and processing of a non-SRI message that is associated with a subscriber that has been ported out of the PCR node operator's network. Again, many other types of mobile signaling messages are defined and currently employed within GSM, PCS, and IS-41 wireless communication networks, and that a PCR node of the present invention may be adapted to accommodate any number of signaling message types.

PCR Operating Scenarios

FIGS. 8 through 15 illustrate several example message routing scenarios associated with a PCR node of the present invention. The sample G-Port™ and GTT data tables 370 and 390, respectively, shown in FIGS. 5a and 5b, respectively, are used to assist in the illustration of the above mentioned example scenarios.

Figure 8:
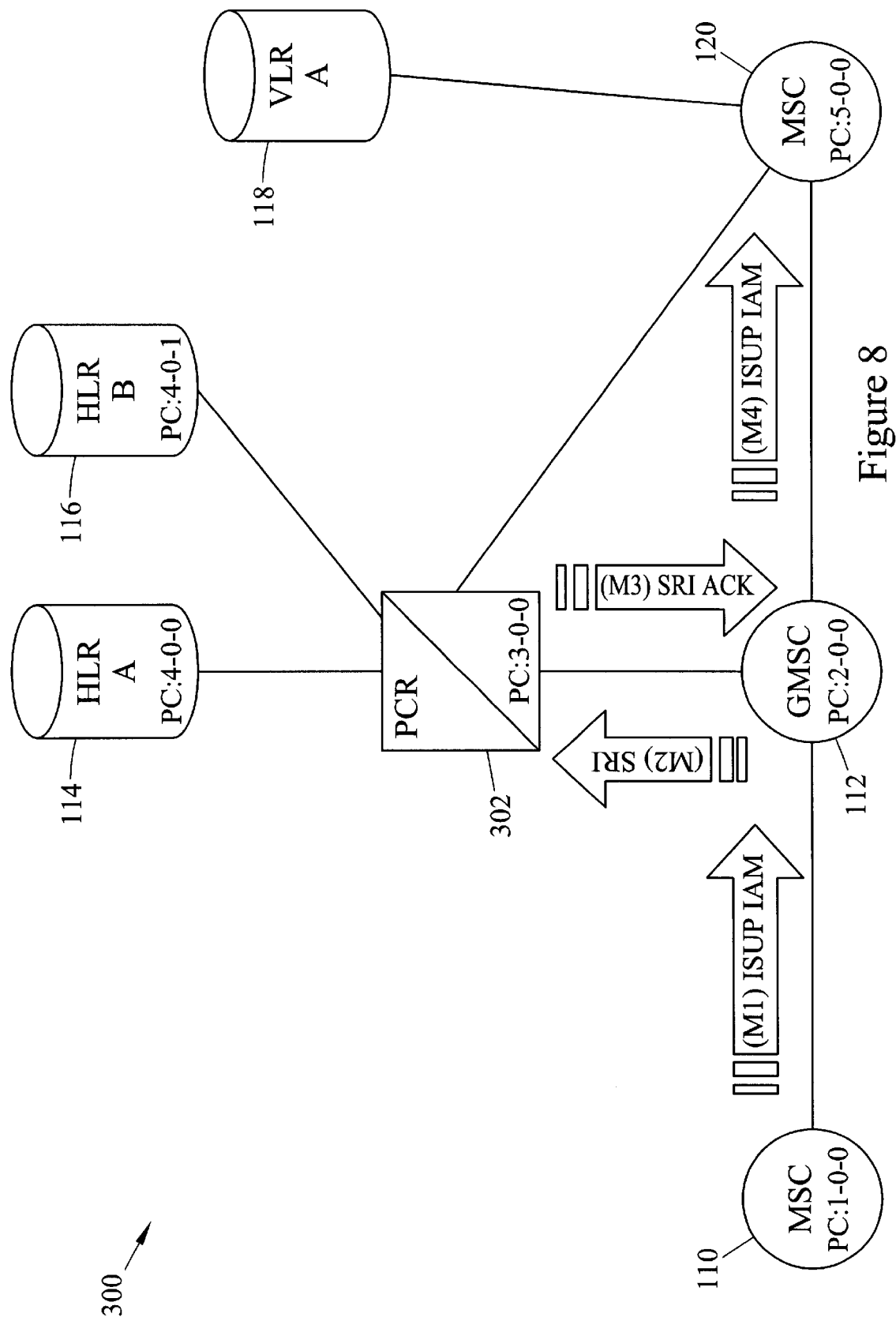
FIG. 8 is a network diagram illustrating signaling message flows associated with the establishment of a call to a mobile subscriber that has been ported out of a service provider's network.

The first message routing scenario, presented in FIG. 8, illustrates the processing of a send routing information (SRI) signaling message by a PCR node of the present invention. More particularly, FIG. 8 includes a mobile communications network, generally indicated by the numeral 300. Network 300 is comprised of an originating mobile switching center (MSC) 110, a gateway MSC 112, a terminating MSC 120, a first home location register (HLR) 114, a second HLR 116, a visitor location register (VLR) 118, and a PCR node 302. These nodes are connected via signaling links, as indicated in FIG. 8, although it will be appreciated that different signaling link types may be employed between different nodes. For instance, the signaling link connection between MSC 110 and GMSC 112 may be a conventional SS7—MTP type signaling link, while the signaling link between PCR 302 and HLR 114 may be a transport adapter layer interface (TALI)—TCP/IP or stream control transmission protocol (SCTP)—IP type signaling link.

In any event, for the purposes of illustration, MSC 110 is assigned an SS7 point code (PC) of 1-0-0, GMSC 112 is assigned a point code of 2-0-0, MSC 120 is assigned a point code of 5-0-0, HLR 114 is assigned a point code of 4-0-0, HLR 116 is assigned a point code of 4-0-1, and PCR node 302 is assigned a point code of 3-0-0. As such, MSC 110 is adapted to generate and launch an ISDN user part (ISUP) initial address message (IAM) M1 in response to a call setup request by a mobile calling party. GMSC 112 receives ISUP IAM message M1 and subsequently generates and launches an SRI query message M2. A partial listing of the contents of this sample SRI query message are presented in FIG. 9. It will be appreciated that SRI message M2 is MTP addressed to a destination point code (DPC), 3-0-0, which corresponds to the PC address of the PCR node 302. As such, the SRI message M2 is transmitted to and generally received by PCR node 302 via an interconnecting signaling link. Upon receipt by the PCR node 302, SRI message M2 is processed at the GPM card 340 in a manner similar to that previously described and generally illustrated in FIG. 4. That is, SRI message M2 is received at SS7 LIM 308 and subsequently examined by the HMDC process 314. As discussed previously, in one embodiment, HMDC process 314 is adapted to examine an MTP DPC parameter 402 value and a service indicator octet (SIO) parameter 404 value contained in the received message packet in order to determine whether further internal SCCP-type processing is required. In this example, the DPC of the received message M2 is equal to the point code address of the PCR node, 3-0-0, and the SIO value indicates that the packet contains an SCCP-type message. Since message M2 is addressed to the PCR node 302 and the message is an SCCP-type message, HMDC process 314 passes the packet to HMDT process 316 with instructions to deliver the message to an available SCCP card (e.g., GPM) for further processing. Consequently, the message M2 is delivered via IMT bus 304 to the available GPM card 340 for processing.

Figure 9:
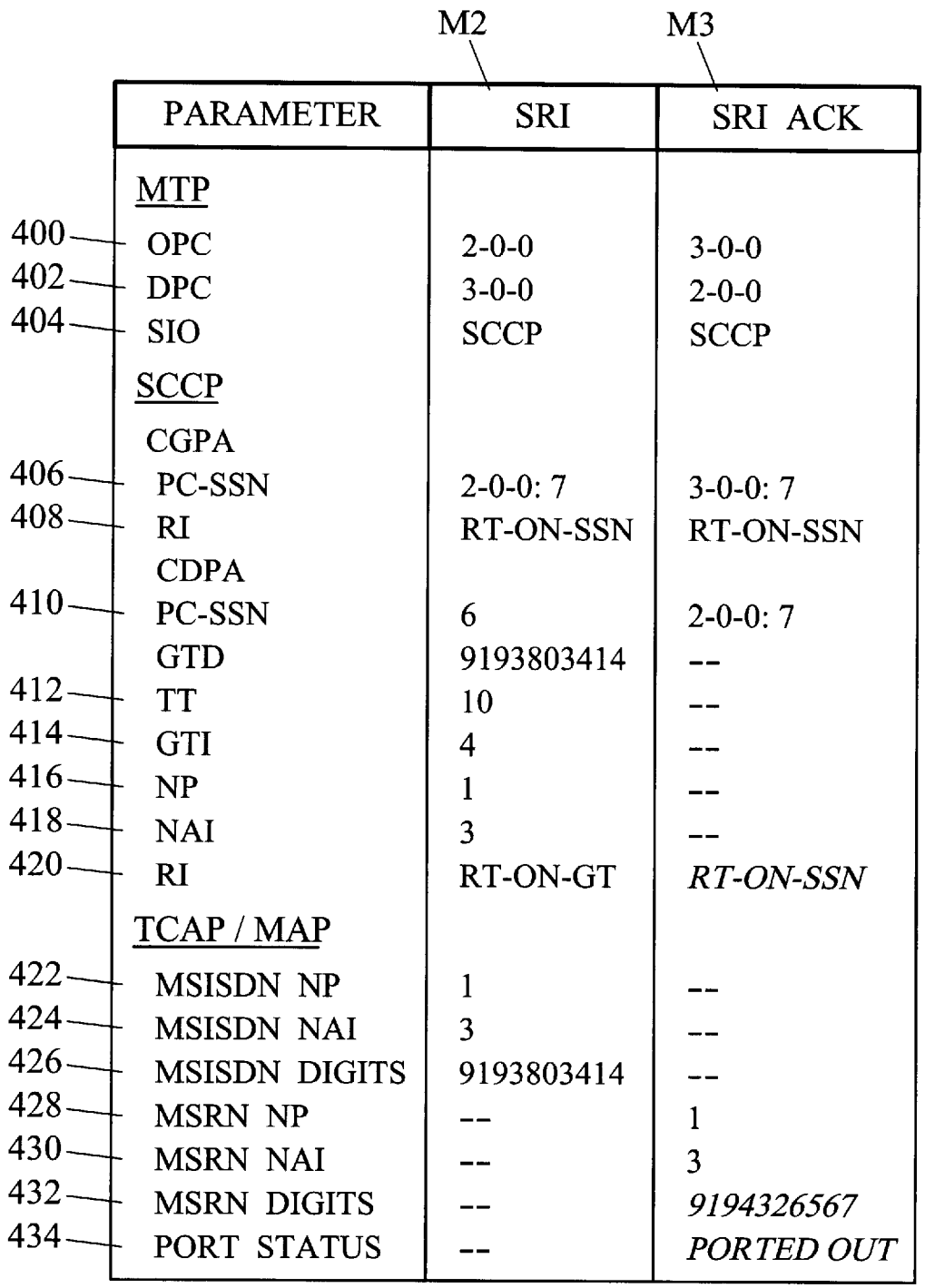
FIG. 9 is a table illustrating parameter values in a send routing information (SRI) message and an SRI acknowledgment (SRI Ack) message associated with the establishment of a call to a mobile subscriber that has been ported out of a service provider's network.

Once received by GPM 340, the SCCP portion of the message M2 is decoded, and a service selection check is performed by the resident SCRC process 344. More particularly, called party (CdPA) routing indicator (RI) parameter 420 contained within SRI message M2 is analyzed to determine whether G-Port™ subsystem processing is necessary. As indicated in FIG. 9, SRI message M2 includes a CdPA RI value of "RT-ON-GT", which indicates the need for G-Port ™ processing. The packet is then passed to G-Port™ database process 346 where TT 412, GTI 414, NP 416, and NAI 418 parameters contained within the signaling message packet are analyzed to determine whether G-Port™ or GTT translation service is required. In this example scenario, message M2 GTI value of 4, translation type (TT) value of 10, "national" NAI value of 3, and "E.164" NP value of 1, are collectively interpreted as indicating the need for a G-Port ™ service. CdPA SSN parameter 410 is next examined to determine the specific mobile service entity type or type of G-Port™ translation service required. More particularly, the SSN value of 6 is interpreted as indicating the need for a G-Port™ HLR entity-type translation. An MSISDN value associated with the called party is next extracted from TCAP/MAP MSISDN Digits field 426 of the message after identifying the message as SRI.

The G-Port™ database is subsequently searched using the called party MSISDN value as at least a portion of the search key. From FIGS. 5a and 9, it will be appreciated that a lookup in the G-Port™ database data table 370 using the called party MSISDN digits parameter 416 value, (919) 380-3814, and HLR entity-type results in a match with the fourth entry or record 450 in data table 370.

As indicated by the G-Port™ data included in record 450, the called party MSISDN associated with original received SRI message M2 is determined to have been ported out of the network being serviced by the PCR node 302, and a new SRI acknowledge (SRI Ack) message is created. This new SRI Ack message M2 is encoded using, in part, the information returned from the G-Port™ database lookup. Among the many parameters in the new SRI Ack message M2 that are set by the PCR node, of particular significance are CdPA RI parameter 420, MSRN digits parameter 432, and the Port Status parameter 434. As illustrated in FIG. 9, the CdPA RI parameter is set to "RT-ON-SSN", which indicates that no further global title type translation is required in order to route message M2 to the final destination node. MSRN digits parameter 432 is set to the routing number of the MSC that is presently serving as the "ported" called party's home MSC, and the Port Status parameter 434 of the new message is set to "Ported Out". Once construction of SRI Ack message M2 is complete, it is passed from the GPM card 340 to the appropriate outbound LIM or DCM in a manner similar to that described above. In this particular scenario, it will be appreciated that new SRI Ack message M2 is routed back to GMSC 112, which generated the original SRI message M1. GMSC 112 subsequently uses information contained in SRI Ack message M2, to modify routing information in the original ISUP IAM message M1. The modified ISUP IAM message is then routed on to its final destination.

The message routing scenario presented in FIG. 8 and generally described above illustrates one of the key aspects of the present invention. That is, a PCR node of the present invention is adapted to effectively intercept an SRI signaling message that is destined for a mobile service node (e.g., HLR) and determine whether access to the requested mobile service node is actually necessary. More particularly, a PCR node is adapted to determine whether a received signaling message is associated with a called party that has been ported out of a service area or network. In the case of a communication protocol or interaction that requires a GMSC to generate and transmit a first signaling query message to a mobile service node and subsequently receive a signaling reply message from the mobile service node, a PCR node of the present invention is adapted to respond to the GMSC node with the signaling reply message on behalf of the mobile service node in the event that the called party associated with the signaling query message has been ported out of the network area serviced by the GMSC. Such is the case in the above-illustrated SRI—SRI Ack communication sequence scenario. However, it will be appreciated that other similar communication sequence scenarios involving signaling messages other than SRI—SRI Ack type messages could also be accommodated by a PCR node. As such, a PCR node of the present invention is able to minimize or eliminate altogether the monopolization of mobile service node resources by signaling message traffic associated with ported mobile subscribers that are no longer serviced by a mobile service node in the PCR node's local service area.

Figure 10:
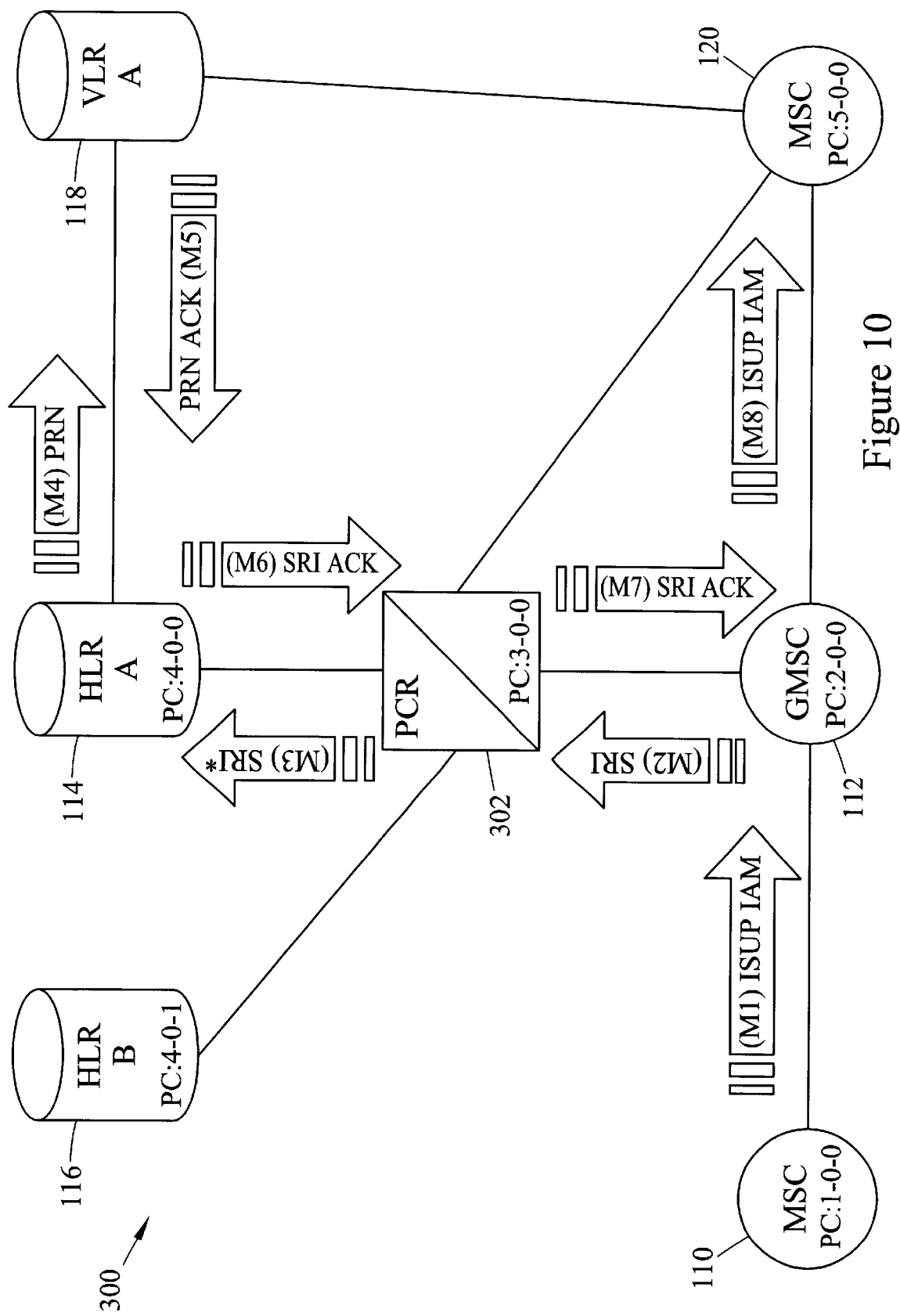
FIG. 10 is a network diagram illustrating signaling message flows associated with the establishment of a call to a mobile subscriber that has not been ported out of a service provider's network.

Presented in FIG. 10 is a signaling scenario that is closely related to the scenario discussed above and generally illustrated in FIG. 8. In the FIG. 10 scenario, GMSC 112 generates and transmits an SRI signaling message to PCR node 302. Within PCR node 302, the message is received by LIM 308 and processed in a similar manner as that described above in the previous scenario. That is, SRI message M2 is examined by processes on LIM 308 and it is determined that internal routing to GPM card 340 is required. Message M2 is received and processed by the SCCP and SCRC processes 342 and 344, respectively, in a manner that is similar to that described for the previous scenario. Once again, examination of the RI, TT, GTI, NP, NAI, and SSN parameter values collectively indicate that G-Port™ processing is required. In this case, however, it will be appreciated from the message content diagram shown in FIG. 11, that the called party MSISDN number is (770) 454-5731, and as such, a search of the G-Port™ database data table 370 results in a match with the third entry or record 452. It will be appreciated from the sample data shown in table 370, that the mobile subscriber corresponding to MSISDN number (770) 454-5731 has not been ported, and is in fact being serviced by the HLR node 114. As a result of this finding, the original SRI message M2 is simply modified to include the routing information necessary to insure delivery to HLR node 114. At this point, it should be noted that if the MSISDN number (770) 454-5731 were not identified as being associated with an exception to the default routing rules stored in the range-based "default" GTT data table, then the SRI message M3 would have been modified so as to include a destination routing address corresponding to the HLR node 116. This is the case because mobile subscribers corresponding to the range of MSISDN numbers from (770) 454-0000 through (770) 454-9999 have been assigned to HLR node 116, as indicated in GTT data table 390 of FIG. 5b. As discussed previously in this disclosure, such re-distribution and re-allocation of HLR subscriber information may be implemented by a network operator in an effort to load share signaling traffic across multiple HLR resources.

Figure 11:
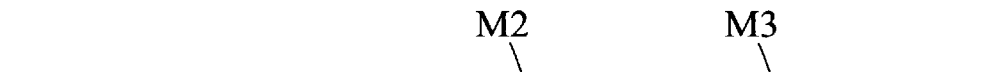
FIG. 11 is a table illustrating parameter values in an original SRI message and a modified SRI message associated with the establishment of a call to a mobile subscriber that has not been ported out of a service provider's network.

In any event, in this case, DPC 402 of modified SRI message M3 is set to the network address of destination HLR node 114, as indicated in FIG. 11. Routing indicator parameter 420 is also changed from the original value of "RT-ON-GT" to the new value of "RT-ON-SSN", thereby indicating that no further routing address translations are required in order to deliver the message to the final destination. Modified SRI message M3 is subsequently passed from GPM 340 via HMRT process 350 to the outbound DCM card 330, as generally illustrated in FIG. 4. It will be appreciated that in this scenario, it is assumed that the signaling link connection between PCR node 302 and HLR node 114 is employs an IP-based protocol (e.g., TALI). As further illustrated in FIG. 10, HLR node 114 receives the modified SRI message M3 sent by PCR node 302 and subsequently generates a provide routing number (PRN) query message M4. PRN message M4 is routed to the VLR node 118 that is currently servicing the called mobile subscriber. VLR node 118 responds to the PRN query with a PRN acknowledge (PRN Ack) message M5, which includes the desired routing number (RN) information associated with the MSC that is currently servicing the called mobile party. HLR node 114 receives PRN Ack message M5 and formulates an SRI Ack message M6 which serves as a response to the original SRI message M2. The SRI Ack message M6 is subsequently routed back to GMSC 112 via the PCR node 302. With regard to SRI Ack message M6, it will be appreciated that no G-Port™ type processing is performed on this message, and that PCR node 302 simply routes the message M6 to GMSC 112. At this point, GMSC 112 receives the SRI Ack message M6 and proceeds with the call setup signaling process in a manner similar to that described above in the previous scenario.

Thus, in this case, a PCR node of the present invention is adapted to effectively intercept an SRI signaling message that is destined for a mobile service node (e.g., HLR) and determine whether mobile service information associated with a called mobile subscriber is stored in a mobile service node location that corresponds to a set of default or range-based routing rules or whether the desired mobile service information is stored in a mobile service node location that is that corresponds to an exception to the set of default or range-based routing rules. In other words, a PCR node of the present invention is adapted to distinguish between a mobile subscriber whose service information has been ported out of a particular service area, and a mobile subscriber whose service information has simply been ported between mobile service nodes that are themselves all within the same service area (i.e., serviced by the same GMSC).

Figure 12:
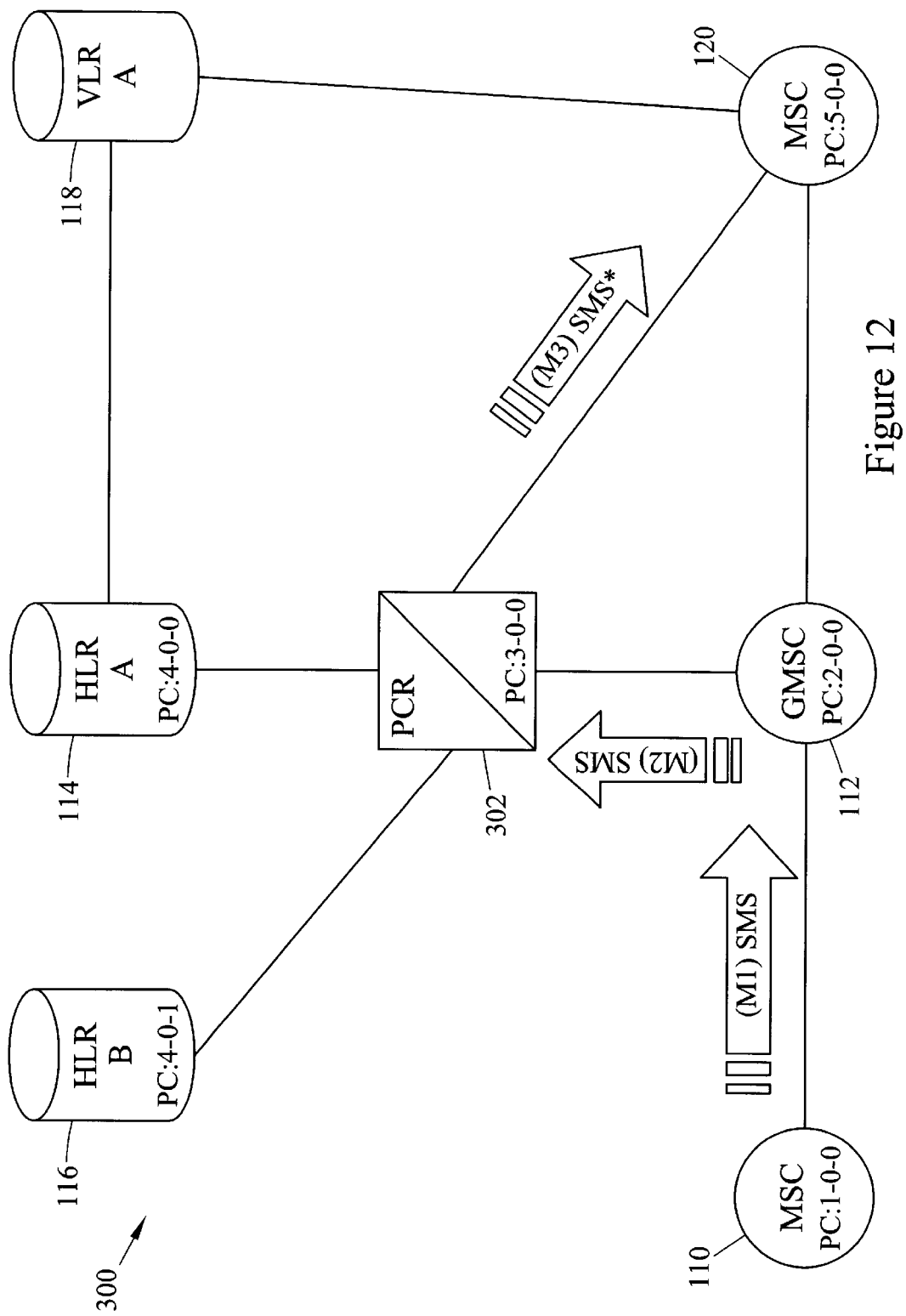
FIG. 12 is a network diagram illustrating signaling message flows associated with a short message service (SMS) communication to a mobile subscriber that has been ported out of a service provider's network.

Presented in FIG. 12 is another significant signaling scenario that is accommodated by a PCR node of the present invention. In this case, the GMSC node 112 receives a short message service (SMS) signaling message M1 from MSC 110. It should be appreciated that, in this situation, an explicit reply message is not required in response to SMS message M1. Instead, SMS message M1 may simply be routed to the intended destination (i.e., the receiving mobile subscriber's pager or handset). As such GMSC 112 receives SMS message M1 and subsequently routes the message to PCR node 302. LIM 308 processing and internal routing of SMS message M2 within PCR node 302 is similar to that described in the previous scenarios, and hence will not be described in detail again here. It should suffice to say that the SMS message is identified as requiring SCCP type processing within the PCR node 302 and, consequently, message M2 is internally routed to GPM card 340. SCCP and SCRC processes 342 and 344, respectively, are again invoked as previously described and the message is determined to require G-Port™ processing. As indicated in the associated message content diagram of FIG. 13, it will be appreciated that the "called" mobile subscriber is identified by an MSISDN digits parameter 426 value of (919) 380-3414. Once again, this called party MSISDN value is used to perform a lookup in G-Port™ data table 370, and in this example it is also assumed that the SMS message requires access to the HLR entity servicing the called party mobile subscriber before routing can be completed. As such, a lookup in G-Port™ database table 370 results in a match with the fourth entry or record 450, as generally indicated in FIG. 5a. Information stored in matching G-Port™ database record 450 indicates that the called party mobile subscriber has been ported out of the GMSC's local service area. In response to this determination, and the fact that an explicit response message is not required, original SMS message M2 is simply modified to include the routing number (RN) associated with the MSC that is currently serving as the called party mobile subscriber's home MSC. In this example, modified SMS message M3 is routed from PCR node 302 and on to the next "hop" in the routing process, which is MSC 120. It should be noted that the routing indicator parameter 420 in the modified SMS message M3 remains set to "RT-ON-GT", thereby indicating that further address translation may be required at some point during the remainder of the routing process.

Once again, it will be appreciated that in such scenarios a PCR node of the present invention again is adapted to minimize or eliminate altogether the monopolization of mobile service node resources by signaling message traffic associated with ported mobile subscribers that are no longer serviced by a mobile service node in the PCR node's local service area.

Figure 14:
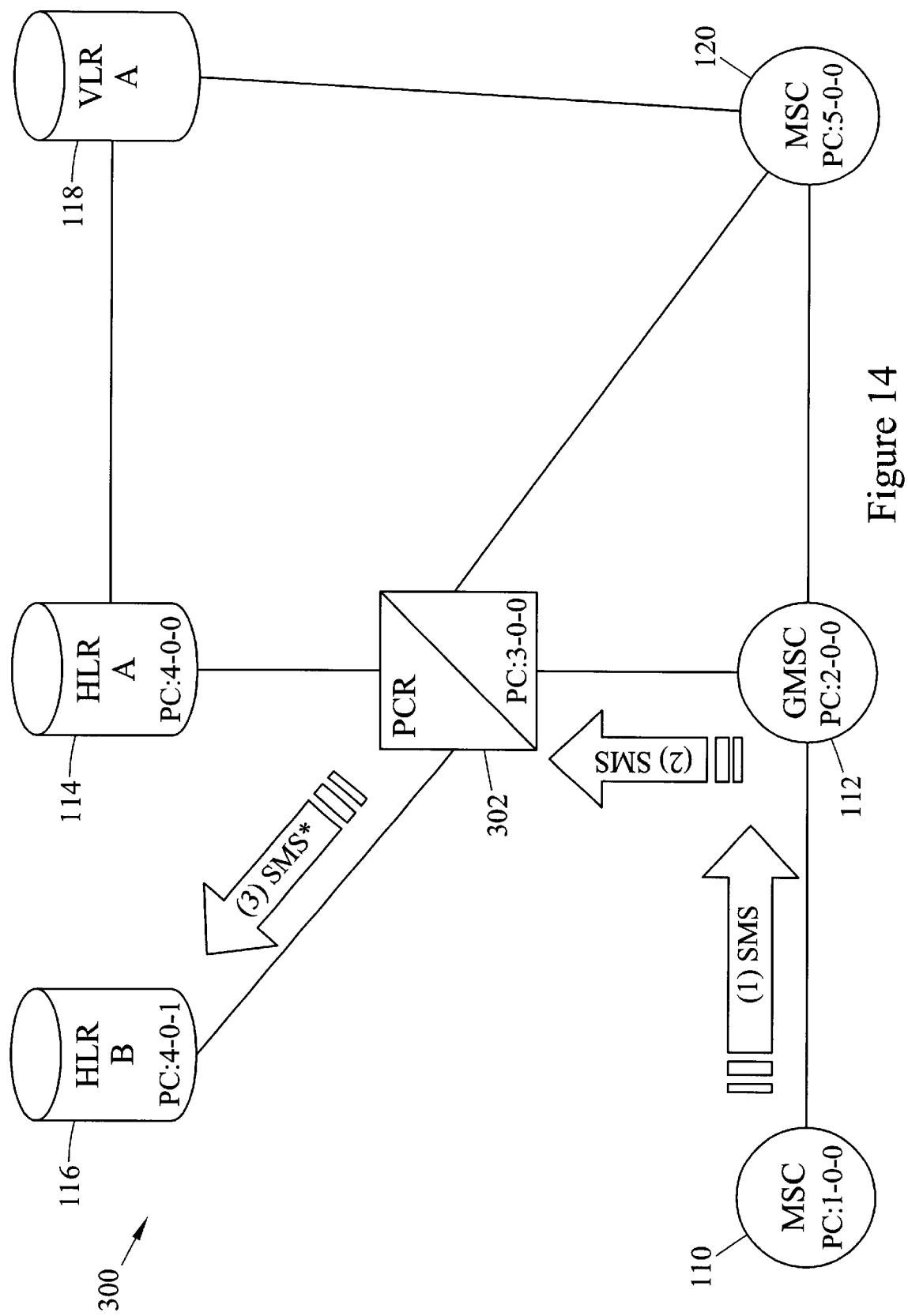
FIG. 14 is a network diagram illustrating signaling message flows associated with a short message service (SMS) communication to a mobile subscriber that has not been ported out of a service provider's network.

A final signaling scenario is illustrated in FIG. 14 which corresponds closely to the second scenario that was presented and discussed in detail above. However, in this final example, it will be appreciated that the signaling message under consideration is an SMS type message, which as mentioned previously, is a type of signaling message that does not require an explicit, corresponding reply message. This final scenario again illustrates the value of a PCRs tandem routing database structure which includes both exception and default range-based data tables with regard to flexibly re-distributing or re-allocating mobile subscriber service information among multiple mobile service node resources.

With regard to the particular example shown in FIG. 14, it will be appreciated that MSC 110 transmits an SMS message M1 to GMSC 112. As such GMSC 112 receives SMS message M1 and subsequently routes the message to PCR node 302. Once again, LIM 308 processing and internal routing of SMS message M2 within the PCR node 302 is similar to that described in the previous scenarios. SMS message M1 is identified as requiring SCCP type processing within the PCR node 302 and, consequently, message M2 is internally routed to GPM card 340. SCCP and SCRC processes 342 and 344, respectively, are again invoked as previously described and the message is determined to require G-Port™ processing. As indicated in the associated message content diagram of FIG. 15, it will be appreciated that the "called" mobile subscriber is identified by an MSISDN digits parameter 426 value of (919) 380-0001. Once again, this called party MSISDN value is used to perform a lookup in G-Port™ data table 370, and in this example it is also assumed that the SMS message requires access to the HLR entity servicing the called party mobile subscriber before routing can be completed. As such, a lookup in G-Port™ database table 370 does not result in a match, as generally indicated in FIG. 5a. As such, GTT data table 390 is subsequently searched, and a match is located at entry or record 454. Information stored in the matching GTT database record 454 indicates that the called party mobile subscriber has service information stored in HLR node 116, as generally indicated in FIG. 5b. In response to this determination, and the fact that an explicit response message is not required, original SMS message M2 is simply modified to include the point code address associated with destination HLR node 116. In this example, the modified SMS message M3 is routed from the PCR node 302 and on to the next "hop" in the routing process, which is HLR 116. It should be noted that the routing indicator parameter 420 in modified SMS message M3 is set to "RT-ON-SSN", thereby indicating that no further address translation is required.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for processing messages in a mobile communications network, the method comprising:
   at a signaling message routing node capable of routing signaling messages between nodes in a mobile communications network:
   (a) receiving a message relating to a communication in a mobile communications network, the message including a called party identifier formerly associated with a subscriber record in a first HLR in a first service provider's network;
   (b) analyzing information in the message to determine whether mobile number portability processing is required for the message;
   (c) in response to determining that mobile number portability processing is required for the message, performing a lookup in a first database located in the signaling message routing node based on the called party identifier to determine whether the called party has been ported into a second service provider's network including a second HLR; and
   (d) in response to determining that the called party has been ported into the second network, relaying the message to the second HLR, wherein performing steps (a)–(d) at a signaling message routing node includes performing steps (a)–(d) at a signal transfer point.

2. The method of claim 1 wherein receiving a message includes receiving a signaling system 7 (SS7) signaling message.

3. The method of claim 2 wherein receiving an SS7 signaling message includes receiving an Internet protocol-encapsulated SS7 signaling message.

4. The method of claim 1 wherein receiving a message includes receiving a send routing information (SRI) signaling message.

5. The method of claim 1 wherein receiving a message includes receiving a session initiation protocol (SIP) signaling message.

6. The method of claim 1 wherein the called party identifier includes a mobile subscriber ISDN (MSISDN) number.

7. The method of claim 1 wherein the called party identifier includes a telephone number associated with a wireline network subscriber.

8. The method of claim 1 wherein the called party identifier includes an electronic mail (email) address.

9. The method of claim 1 wherein the called party identifier includes an Internet protocol (IP) address.

10. The method of claim 1 wherein analyzing information in the message to determine whether number portability processing is required includes examining a translation type (TT) parameter.

11. The method of claim 1 wherein analyzing information in the message to determine whether mobile number portability processing is required includes examining a global title indicator (GTI) parameter.

12. The method of claim 1 wherein analyzing information in the message to determine whether mobile number portability processing is required includes examining a numbering plan (NP) parameter.

13. The method of claim 1 wherein analyzing information in the message to determine whether mobile number portability processing is required includes examining a nature of address indicator (NAI) parameter.

14. The method of claim 1 wherein performing a lookup in the first database includes performing a lookup in the database based on a mobile service entity type in the message.

15. The method of claim 14 wherein the mobile service entity type indicates a home location register.

16. The method of claim 1 wherein performing a lookup in a first database includes performing a lookup in an exceptions-based routing database having entries that are exceptions to ranges of called party identifiers.

17. The method of claim 16 comprising in response to failing to locate an entry corresponding to the called party identifier in the first database, performing a second lookup in a second database based on the called party identifier, wherein performing a lookup in the second database includes performing a lookup in a range-based routing database having entries corresponding to the ranges of called party identifiers.

18. The method of claim 1 wherein performing steps (a)–(d) at a signal transfer point includes performing steps (a)–(d) at a signal transfer point including SS7/IP gateway functionality.

19. A signal transfer point for routing messages between nodes in mobile communications network, the signal transfer point comprising:
(a) a communication module in the signal transfer point for receiving a message relating to a call in a mobile communications network, the message including a called party identifier formerly associated with a subscriber record in a first HLR in a first service provider's network;
(b) a first database located in the signal transfer point containing entries corresponding to called party identifiers, the entries each including information as to whether mobile number portability processing is required for call signaling messages and information as to whether the called party is a ported in subscriber; and
(c) a database controller in the signal transfer point for determining, based on the information in the first database, whether mobile number portability processing is required for the message and whether the called party is a ported in subscriber, and, in response to determining that mobile number portability processing is required for the first message and that the called party is a ported in subscriber, relaying the message to a second HLR in a second service provider's network into which the subscriber has been ported, wherein the communication module includes a transmission control protocol/Internet protocol (TCP/IP)—capable data communication module (DCM) for sending and receiving SS7 messages over an IP network.

20. The signal transfer point of claim 19 wherein the first database comprises an exception-based database and each entry in the exception-based database is an exception to a set of default routing rules.

21. The signal transfer point of claim 20 comprising a range-based database containing entries corresponding to ranges of called party identifiers wherein each entry in the exception-based database contains a called party identifier or range of called party identifiers that do not fall within any of the called party identifier ranges in the range-based database.

22. The routing node of claim 19 wherein the database controller determines whether number portability processing is required by examining at least one of a translation type (TT), global title indicator (GTI), numbering plan (NP), and nature of address (NAI) parameters in the first message.

23. The method of claim 19 wherein the called party identifier in the message is a number within a block of called party identifiers assigned to the first HLR and outside of a block of called party identifiers assigned to the second HLR.

24. A routing node for processing messages in mobile communications network, the routing node comprising:
(a) a communication module for receiving a first message destined for a mobile services node and relating to a call in a mobile communications network, the first message including a called party identifier;
(b) a first database containing entries corresponding to called party identifiers, the entries each including information as to whether number portability processing is required for call signaling messages and information as to whether a reply is required for the call signaling messages; and
(c) a database controller for determining, based on the information in the first database, whether number portability processing is required for the first message, and, in response to determining that number portability processing is required for the first message, determining whether a reply is required for the first message, and in response to determining that a reply is required for the first message, formulating the reply, wherein first database comprises an exception-based database and each entry in the exception-based database is an exception to a set of default routing rules, and wherein the routing node further comprises a range-based database containing entries corresponding to ranges of called party identifiers, wherein each entry in the exception-based database contains a called party identifier or range of called party identifiers that do not fall within any of the called party identifier ranges in the range-based database, and wherein the database controller searches the exception-based database, and, in response to failing to locate an entry in the exception-based database, searches the range-based database.

25. The signal transfer point of claim 19 wherein the message is a send routing information (SRI) message.

26. The signal transfer point of claim 19 wherein the message is a session initiation protocol (SIP) message.

27. The signal transfer point of claim 19 wherein the message is a short message service (SMS) message.

28. A method for routing short message service messages directed to ported mobile subscribers, the method comprising:
at a signaling message routing node capable of routing signaling messages between nodes in a mobile communications network:
(a) receiving, from a mobile switching center, a short message service message including a receiving party identifier associated with a receiving party who has been ported out of a first service provider's network;
(b) determining whether mobile number portability processing is required for the short message service message;

(c) in response to determining that mobile number portability processing is required for the short message service message, performing a lookup in a mobile number portability database located in the signaling message routing node to determine routing information for the short message service message; and (d) relaying the short message service message to a second mobile switching center in a second service provider's network to which the receiving party has been ported based on the routing information, wherein performing steps (a)–(d) at a signaling message routing node includes performing steps (a)–(d) at a signal transfer point.

29. The method of claim 28 wherein performing steps (a)–(d) at a signal transfer point includes performing steps (a)–(d) at a signal transfer point including SS7/IP gateway functionality.

30. The method of claim 1 wherein the called party identifier in the message is a number within a block of called party identifiers assigned to the first HLR and outside of a block of called party identifiers assigned to the second HLR.

31. The method of claim 28 wherein the receiving party identifier is within a block of receiving party identifiers assigned to the first service provider's network and outside a block of receiving party identifiers assigned the second service provider's network.

32. A signal transfer point for intercepting signaling messages intended for an HLR and for responding on behalf of the HLR, the signal transfer point comprising:

(a) a mobile number portability database containing entries for ported out subscribers, the entries being indexed by MSISDN numbers, the MSISDN numbers being within a range of MSISDN numbers assigned to an HLR in a first service provider's network from which the subscribers have been ported and outside of a range of MSISDN numbers assigned to an HLR in a second service provider's network into which the subscribers have been ported; and (b) a mobile number portability database manager for intercepting messages containing called party MSISDN numbers falling in the range of MSISDN numbers assigned to the HLR in the first service provider's network and for responding on behalf of the HLR in the first service provider's network using information stored in the mobile number portability database.

33. A signal transfer point for relaying messages directed to ported in subscribers to an HLR in a network to which the subscribers have been ported, the signal transfer point comprising:

(a) a mobile number portability database for storing entries indexed by individual subscriber MSISDN numbers for ported in subscribers, the MSISDN numbers being outside of a range of MSISDN numbers assigned to an HLR in a first service provider's network to which the subscribers have been ported and within a range of MSISDN numbers assigned to an HLR in a second service provider's network from which the subscribers have been ported;

(b) a mobile number portability database module for receiving messages relating to subscribers that have been ported from one service provider's network to another service provider's network and that are global-title-addressed to the individual subscriber MSISDN numbers and for relaying the messages to the HLR in the first service provider's network to which the subscribers have been ported.

* * * * *